United States Patent
Benson et al.

(10) Patent No.: US 12,515,173 B2
(45) Date of Patent: *Jan. 6, 2026

(54) FILTER CASSETTE ARTICLE, AND FILTER COMPRISING SAME

(71) Applicant: SMARTFLOW TECHNOLOGIES, INC., Sanford, NC (US)

(72) Inventors: Todd Benson, Sanford, NC (US); Marc Pugh, Sanford, NC (US); Jason Bell, Sanford, NC (US); Mark Vander Hoff, Sanford, NC (US); Kelly Johnson, Sanford, NC (US); Jonathan Barth, Sanford, NC (US); Bradford East, Sanford, NC (US); Cameron Gunter, Sanford, NC (US); Max Prendergast, Sanford, NC (US)

(73) Assignee: SMARTFLOW TECHNOLOGIES, INC., Sanford, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,711

(22) Filed: May 11, 2023

(65) Prior Publication Data
US 2023/0302410 A1 Sep. 28, 2023

Related U.S. Application Data

(62) Division of application No. 17/208,225, filed on Mar. 22, 2021, now Pat. No. 11,654,397, which is a
(Continued)

(51) Int. Cl.
*B01D 63/08* (2006.01)
*B01D 25/21* (2006.01)

(52) U.S. Cl.
CPC ....... *B01D 63/0822* (2022.08); *B01D 25/215* (2013.01); *B01D 2313/44* (2013.01)

(58) Field of Classification Search
CPC .............. B01D 63/0822; B01D 25/215; B01D 2313/44; B01D 2313/105; B01D 2313/125; B01D 63/084
(Continued)

(56) References Cited

U.S. PATENT DOCUMENTS

| 744,761 A | 11/1903 | James |
| 802,105 A | 10/1905 | Johnson et al. |

(Continued)

FOREIGN PATENT DOCUMENTS

| DE | 2930986 A1 | 2/1980 |
| DE | 3127548 A1 | 4/1982 |

(Continued)

OTHER PUBLICATIONS

Prostack™ Bench Top Development System Lit. No. SD200, Aug. 1988.
(Continued)

*Primary Examiner* — Madeline Gonzalez
(74) *Attorney, Agent, or Firm* — Casimir Jones, S.C.; Tristan A. Fuierer

(57) ABSTRACT

A filtration cassette including a multilaminate array of sheets including filter sheets alternating with permeate sheet members and retentate sheet members, and a cross-flow filter device comprising a multiplicity of stacked filtration cassettes of such type. The improvements associated with the filtration cassettes described herein include, but are not limited to, at least one of: reinforced inlet(s) providing for longevity and improved cleanability of the cassettes; spacer permeate screens to limit throughput restriction; stainless steel or otherwise stiffened permeate sheets to prevent movement and increase flux; and stainless steel permeate sheets that can be used with ultrasonic transmission to minimize fouling of the filter sheets and extend cleaning
(Continued)

cycles. Advantageously, the filtration cassettes are more resistant to higher temperatures than the filtration cassettes of the prior art.

20 Claims, 22 Drawing Sheets

Related U.S. Application Data division of application No. 16/386,470, filed on Apr. 17, 2019, now Pat. No. 10,987,631.

(60) Provisional application No. 62/658,787, filed on Apr. 17, 2018.

(58) Field of Classification Search
USPC ......... 210/231, 321.72, 321.75, 321.84, 489, 210/232, 228, 227, 488, 456, 323.1
See application file for complete search history.

(56) References Cited

U.S. PATENT DOCUMENTS

| | | | |
|---|---|---|---|
| 1,138,251 A | 5/1915 | Schaefer | |
| 1,282,414 A | 10/1918 | Hagstrom | |
| 1,540,251 A | 6/1925 | William et al. | |
| 2,390,628 A | 12/1945 | Winkle | |
| 2,473,986 A | 6/1949 | Martin | |
| 2,590,242 A | 3/1952 | Fusco | |
| 3,221,883 A | 12/1965 | Valdemar | |
| 3,520,803 A | 7/1970 | Iaconelli | |
| 3,585,131 A | 6/1971 | Esmond | |
| 3,988,242 A | 10/1976 | Kurita et al. | |
| 4,229,304 A | 10/1980 | Fismer | |
| 4,235,721 A | 11/1980 | Nakamura | |
| 4,310,416 A | 1/1982 | Tanaka | |
| 4,411,784 A | 10/1983 | Esmond | |
| 4,430,218 A | 2/1984 | Perl et al. | |
| 4,540,492 A | 9/1985 | Kessler | |
| 4,543,187 A | 9/1985 | Steppacher | |
| 4,624,784 A | 11/1986 | Lefebvre | |
| 4,735,718 A | 4/1988 | Peters | |
| 4,750,983 A | 6/1988 | Foster et al. | |
| 4,769,140 A | 9/1988 | Van Dijk et al. | |
| 4,801,381 A | 1/1989 | Niesen | |
| 4,867,876 A | 9/1989 | Kopf | |
| 4,882,050 A | 11/1989 | Kopf | |
| 4,885,087 A | 12/1989 | Kopf | |
| 4,956,085 A | 9/1990 | Kopf | |
| 4,997,464 A | 3/1991 | Kopf | |
| D316,740 S | 5/1991 | Kopf | |
| 5,024,967 A | 6/1991 | Kopf et al. | |
| 5,034,124 A | 7/1991 | Kopf | |
| 5,049,268 A | 9/1991 | Kopf | |
| 5,053,060 A | 10/1991 | Kopf-Sill et al. | |
| D322,117 S | 12/1991 | Kopf | |
| D323,202 S | 1/1992 | Kopf | |
| D324,720 S | 3/1992 | Kopf | |
| D325,070 S | 3/1992 | Kopf | |
| 5,115,441 A | 5/1992 | Kopf et al. | |
| D327,313 S | 6/1992 | Kopf | |
| D328,789 S | 8/1992 | Kopf | |
| 5,232,589 A | 8/1993 | Kopf | |
| 5,259,971 A | 11/1993 | Kopf | |
| 5,342,517 A | 8/1994 | Kopf | |
| D357,059 S | 4/1995 | Kopf | |
| 5,437,796 A | 8/1995 | Brueschke et al. | |
| 5,445,737 A | 8/1995 | Ondrick | |
| 5,593,580 A | 1/1997 | Kopf | |
| 5,868,930 A * | 2/1999 | Kopf | B01D 63/081 |
| | | | 210/488 |
| D418,587 S | 1/2000 | Kopf | |
| 6,017,451 A | 1/2000 | Kopf | |
| 6,022,742 A | 2/2000 | Kopf | |
| D422,685 S | 4/2000 | Kopf | |
| 6,048,727 A | 4/2000 | Kopf | |
| 6,127,141 A | 10/2000 | Kopf | |
| 6,139,746 A | 10/2000 | Kopf | |
| 6,214,221 B1 | 4/2001 | Kopf | |
| 6,214,574 B1 | 4/2001 | Kopf | |
| 6,383,380 B1 | 5/2002 | Kopf | |
| 6,569,340 B2 | 5/2003 | Kopf | |
| 6,596,172 B1 | 7/2003 | Kopf | |
| 6,827,960 B2 | 12/2004 | Kopf | |
| 6,852,352 B2 | 2/2005 | Kopf | |
| 6,875,459 B2 | 4/2005 | Kopf | |
| 6,946,075 B2 | 9/2005 | Kopf | |
| 7,544,296 B2 | 6/2009 | Kopf | |
| 8,795,530 B2 | 8/2014 | Kopf et al. | |
| 9,163,265 B2 | 10/2015 | Benson et al. | |
| 9,745,333 B2 | 8/2017 | Kopf et al. | |
| 9,783,750 B2 | 10/2017 | Vander Hoff et al. | |
| 10,005,697 B1 | 6/2018 | Vander Hoff et al. | |
| 10,987,631 B2 * | 4/2021 | Benson | B01D 63/084 |
| 11,654,397 B2 * | 5/2023 | Benson | B01D 25/215 |
| | | | 210/231 |
| 2003/0205514 A1 | 11/2003 | Potter et al. | |
| 2005/0053707 A1 | 3/2005 | Kopf | |
| 2011/0309018 A1 | 12/2011 | Kopf et al. | |
| 2013/0015119 A1 | 1/2013 | Pugh et al. | |
| 2013/0115588 A1 | 5/2013 | Davis et al. | |
| 2013/0212932 A1 | 8/2013 | Bell et al. | |
| 2013/0236938 A1 | 9/2013 | Vander Hoff et al. | |
| 2013/0255487 A1 * | 10/2013 | Edlund | B01D 63/0821 |
| | | | 95/45 |

FOREIGN PATENT DOCUMENTS

| | | |
|---|---|---|
| DE | 229603 A1 | 11/1985 |
| DE | 10122095 A1 | 11/2002 |
| EP | 36926 B1 | 8/1984 |
| GB | 1392030 A1 | 4/1975 |
| WO | WO 8600237 A1 | 1/1986 |
| WO | WO 02/089950 A2 | 11/2002 |

OTHER PUBLICATIONS

"Laboratory Ultrafiltration Products for Improved Biologicals Recover," Lit. No. AB841, Oct. 1988.
"Shorten the Race to the Market with Millipore Pilot and Process Systems," Lit. No. SD100, Jan. 1988.
Minisette® Systems, Tangential Ultrafiltration and Microfiltration Membrane Cassette Systems for Processing Columes of 1-20 Liter Batches. Product Brochure of Filtron Technology Corporation, 50 Bearfoot Road, Northborough, MA 01532, Copr. 1989, Literature No. FPL004.
Microporous Filters, OHV Configuration Installation Instructions, Copr. 1978, Millipore Corporation, Bedford, MA, Product Literature Part No. 6847.
Extended European Search Report in EP Application No. 19787819.2 dated Dec. 7, 2021.

* cited by examiner

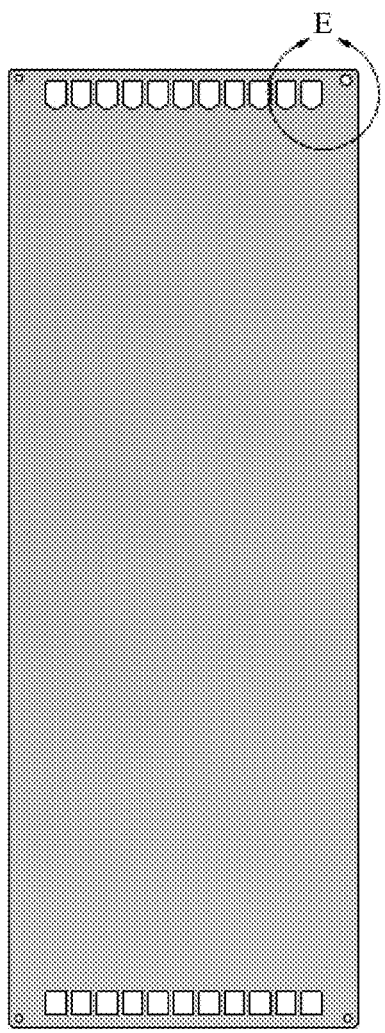
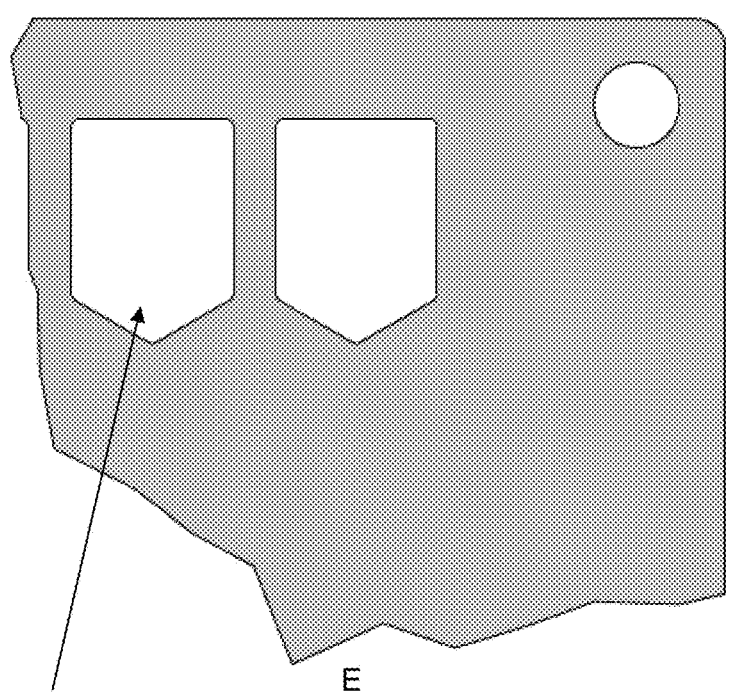
FIGURE 4D
FIGURE 4E
9 or 12
E
detail scale 4:1

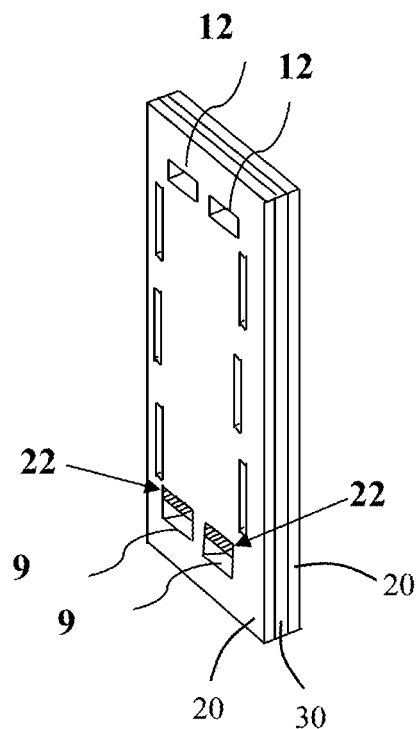
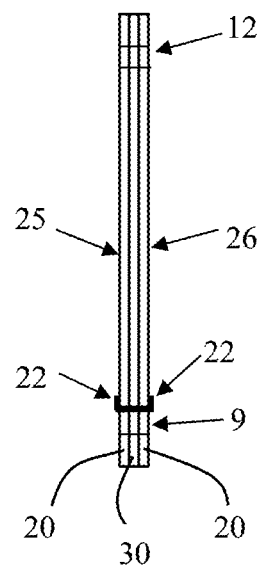
FIGURE 5A FIGURE 5B
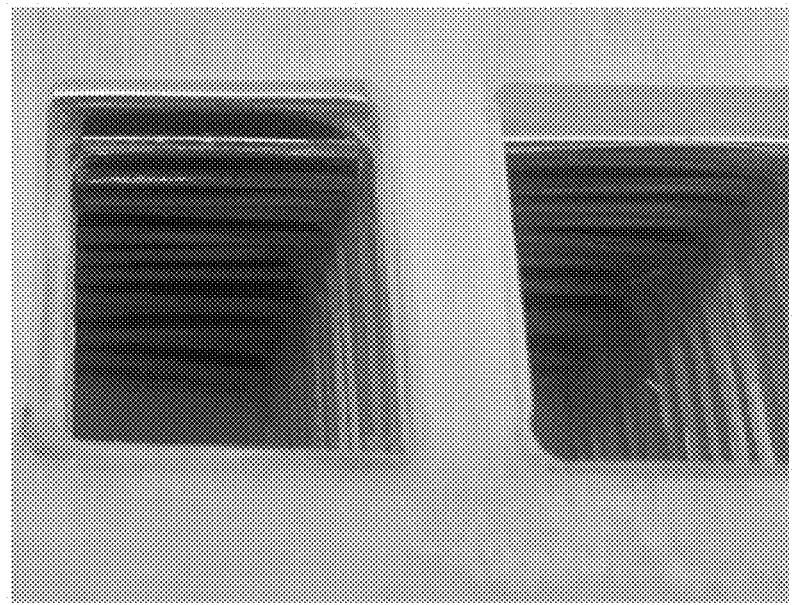
FIGURE 5C

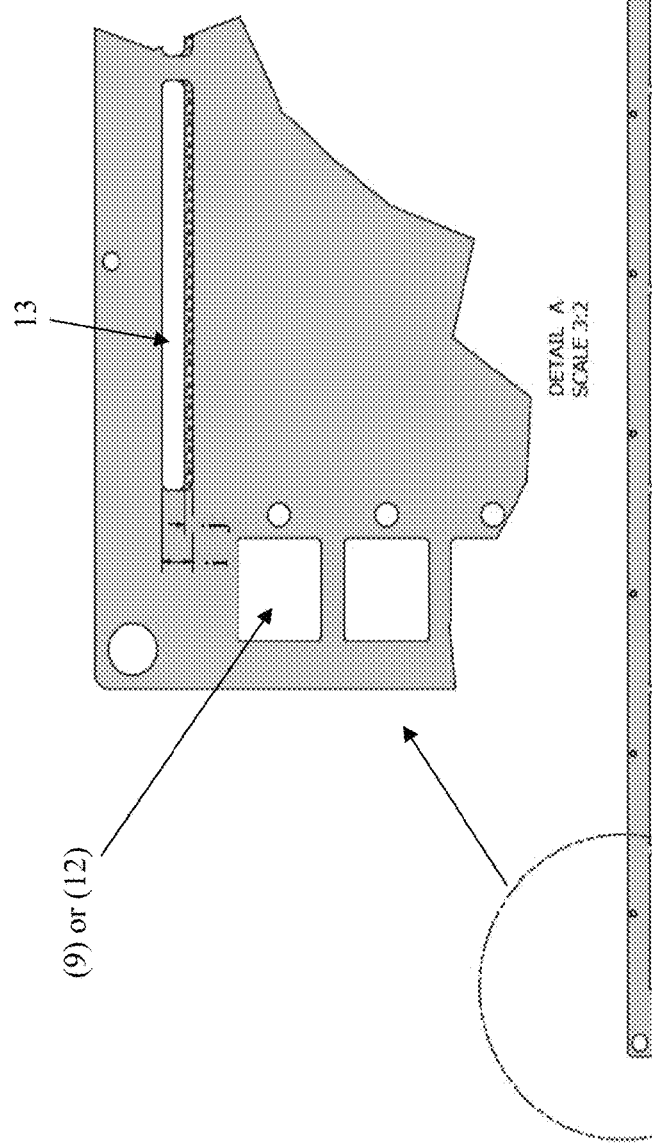
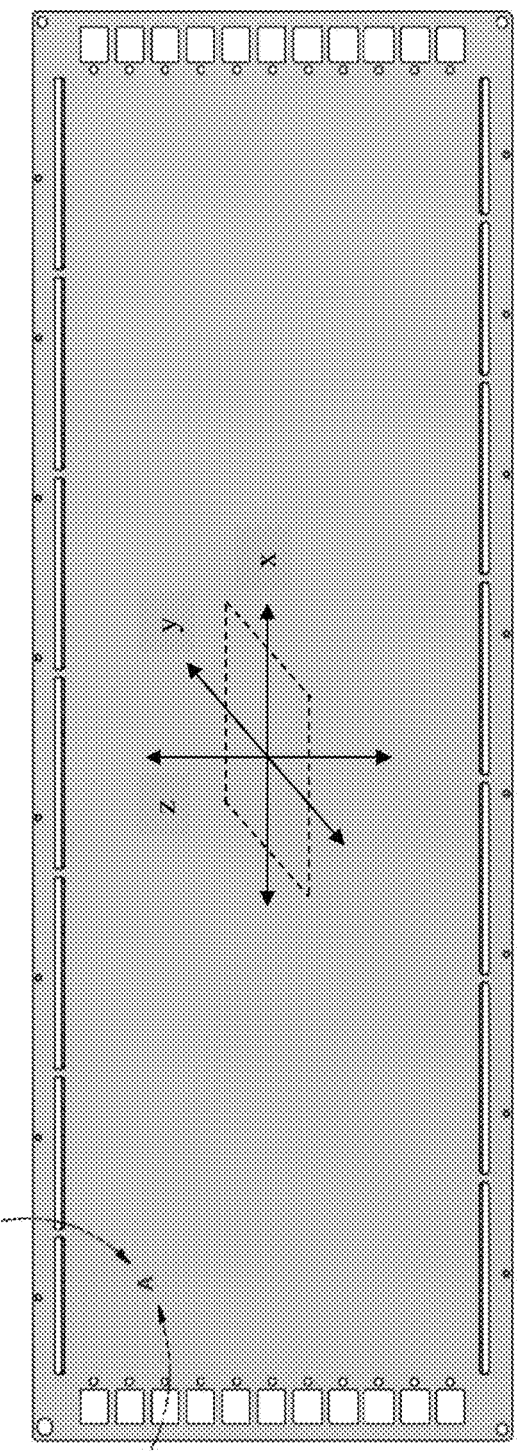
FIGURE 17B
FIGURE 17A

FILTER CASSETTE ARTICLE, AND FILTER COMPRISING SAME

CROSS-REFERENCE TO RELATED APPLICATIONS

This application is divisional application under 35 U.S.C. § 121 and claims priority to U.S. patent application Ser. No. 17/208,225 filed on Mar. 22, 2021, now U.S. Pat. No. 11,654,397, which is a divisional of U.S. patent application Ser. No. 16/386,470 filed on Apr. 17, 2019, now U.S. Pat. No. 10,987,631, which claims priority to U.S. Provisional Application No. 62/658,787 filed on Apr. 17, 2018, the contents of all of which are incorporated by reference herein for all purposes.

FIELD

The present invention relates generally to improved filtration cassettes, comprising filter sheets arranged in a multilaminate, peripherally bonded array wherein the filter sheets alternate with at least one foraminous (e.g., screen or mesh) permeate sheet element, and retentate channel elements. The improvements associated with the filtration cassettes described herein include, but are not limited to, at least one of: reinforced inlet(s) providing for longevity and improved cleanability of the cassettes; spacer permeate screens to limit throughput restriction; stainless steel or otherwise stiffened permeate sheets to prevent movement and increase flux; and stainless steel permeate sheets that can be used with ultrasonic transmission to minimize fouling of the permeate sheet and extend cleaning cycles.

BACKGROUND

Stacked plate cross-flow filters are utilized in a variety of solids-liquid or liquid-liquid separation operations, including the dewatering of solids-liquid suspensions such as aqueous biomass suspensions, the desalting of proteins, and the removal of secreted metabolites from cellular cultures. In such systems, the stacked plates making up the cross-flow filter are typically mounted in a frame structure whereby the respective plates are retained in alignment with one another, in a so-called "plate and frame" construction.

The plate and frame filter typically utilizes a liquid source material conduit extending through the stacked plates as a means to introduce liquid source material into the flow channels defined between adjacent plates in the stacked plate assembly. The flow channels in the plate and frame filter contain filter elements, such as disposable filter paper sheets or polymeric membranes, with which the liquid source material is contacted and through which a permeate passes. A withdrawal conduit correspondingly extends through the stacked plates, in liquid flow communication with the respective flow channels of the stacked plate assembly, and conveys a retentate out of the filter system. A permeate conduit is also provided to withdraw permeate out of the stacked plate assembly.

As filtration proceeds in the plate and frame filters of the prior art, the solids become more concentrated in the flow channels of the filter, on the "liquid source material sides," i.e., active filtration surfaces in the open area between the adjacent filter sheets, until the desired concentration has been achieved and the desired volume processed or until the flux has decayed to the point that cleaning is justified. The filter is then harvested for solids and liquids and then drained prior to being cleaned in place (CIP), or alternatively, it may be fully shut down after a predetermined time or after a predetermined level of solids has accumulated in the flow channels between the filtration surfaces of the filter sheets, following which the system is drained of liquid and then cleaned in place (CIP).

Applicant's filter plate as disclosed in prior U.S. Pat. No. 5,593,580 is efficient in effecting mass transfer operations, e.g., dewatering of aqueous biomass suspensions, desalting of proteins, and removal of secreted metabolites from cellular suspensions. Such filter plate, shown in FIG. 1, is of a type comprising filter sheets arranged in a multilaminate, peripherally bonded array, wherein the filter sheet elements (20) alternate with foraminous (e.g., screen or mesh) permeate sheet elements (30), and ribbed retentate channel elements (10). Each of sheets is generally co-extensive in areal extent with the others, and when consolidated into a cassette article, the fluid inlet cutout opening (9) and the fluid outlet cutout opening (12) and open retentate flow channels (8) in each of the respective sheet elements are in registration.

The principal feature of the portion of the prior art assembly shown in FIG. 1 is to enable uniform retentate flow via transversely-located open retentate flow channels (8) that are identical in length and create an even path length within the filter module from the inlet of the module to the outlet of the module as shown in FIG. 2. Uniform retentate flow in an open channel (8) greatly improves the consistency of separation as well as the ability to clean the filter plate.

While applicant's prior art filter modules function well within their design limits, the market still demands alternative filter modules that can be utilized under different, and often more extreme, conditions. The improvements described herein enable tolerance for higher cross flow rates per unit area, higher particulate loadings, and improved resistance to back pressure. In the filter modules of the prior art, when the velocity and/or viscosity of the liquid source material or retentate is increased beyond a predefined limit, several effects can arise. For example, some of the entrances to the retentate flow channels (8) may cease to remain stiff and parallel to the adjacent retentate flow channel (see, e.g., FIG. 3A relative to FIG. 3B). This occurs when sheet material at the fluid inlet openings (9) bends or folds and thus blocks the entrance to an adjacent retentate flow channel (8), thereby increasing the flow rate to the remaining unobstructed channels. This can result in a cascading effect whereby the same recirculating cross flow rate is continuously being presented to an ever-decreasing number of pathways (i.e., retentate flow channels). Resultantly, the flux rate reduces as decreasing filter sheet surface area is available to the recirculating fluid. Further, the obstructed retentate channels become difficult to clean.

A similar effect occurs within the length of the retentate flow channel of the prior art when operated beyond its design limit. As the pressure drop down the retentate flow channel increases, the "stiffness" of a particular channel's support (i.e., first filter sheet (20), permeate sheet (30), second filter sheet (20) spanning the cross section of the retentate channel) may be distended, especially when the liquid source material or retentate has a very high viscosity and/or a very high solids content. As a result, the distended channel begins to encroach into the adjacent retentate flow channel, which can partially collapse. This triggers the cascade effect described above whereby the flux rate decreases, the recirculating velocity decreases in the affected channel and the suspended solids may aggregate and solidify in the affected channel thus rendering the filter module hard or impossible to clean.

Accordingly, alternative filtration cassettes of a type which provide improved mass transfer efficiency and utility relative to the filter cassettes of the prior art are described herein. The alternative filtration cassettes maximize the flux rate through the filter cassette, as well as efficiency of cleaning. Further, the alternative filtration cassettes are more resistant to higher temperatures than the filtration cassettes of the prior art.

SUMMARY

The present invention relates to an alternative filtration module that can be utilized under different, and often more extreme, conditions.

In one aspect, a filtration cassette is described, said filtration cassette comprising at least one assembly, wherein the at least one assembly comprises:
  a multilaminate array of sheet members of generally rectangular and generally planar shape, each sheet having a first end and a second end longitudinally opposite the first end and a thickness, wherein the sheet members comprise in sequence in said array a first retentate sheet, (a first filter sheet, a permeate sheet, a second filter sheet, and a second retentate sheet)$_n$, wherein each of the first filter sheet, the permeate sheet, and the second filter sheet members in said array have at least one fluid opening at the first end thereof, and at least one fluid opening at the second end thereof, wherein the first end fluid opening(s) of the array are in register with one another and the second end fluid opening(s) of the array are in register with one another, and wherein n=1, 2, 3, 4, 5, 6, 7, 8, 9, 10, or more, wherein the first and second retentate sheets have at least one channel opening therein, each channel opening extending longitudinally between the first end fluid opening(s) and the second end fluid opening(s) in the array and wherein the at least one channel opening is open through the entire thickness of the first and second retentate sheets to permit a fluid to contact the adjacent filter sheets, and wherein the first and second retentate sheets are bonded to the adjacent filter sheets about peripheral end and side portions thereof; and
  two assembly end plates sandwiching the multilaminate array of sheets, wherein the two assembly end plates comprise at least one fluid opening at the first end thereof, and at least one fluid opening at the second end thereof, or both, in register with the fluid openings of the array,
  wherein the at least one assembly further comprises at least one permeate passage opening at longitudinal side margin portions of the assembly(s),
wherein the filter cassette further comprises at least one of options (I), (II), (III), or (IV), or any combination of (I)-(IV):
  (I) a cap positioned on at least a portion of the first end fluid opening(s) or at least a portion of the second end fluid opening(s), or both, of a permeate pack, wherein the permeate pack comprises the first filter sheet, the permeate sheet, and the second filter sheet members, wherein the cap is positioned proximate to the channel openings of the first and second retentate sheets;
  (II) the fluid openings at the first end, the fluid openings at the second end, or both the fluid openings at the first and second end, are cut as an irregular pentagon having a "V" positioned proximate to the channel openings of the first and second retentate sheets;
  (III) a first permeate screen spacer positioned between the first filter sheet and the permeate sheet or a second permeate screen spacer positioned between the second filter sheet and the permeate sheet, or both, wherein the permeate screen spacer(s) comprise fluid openings in register with the fluid openings of the array;
  (IV) the permeate sheet comprises a metal matrix or other reinforced porous material of requisite thickness.

In another aspect, a method of separating a target substance from a liquid source material is described, said method comprising:
  flowing the liquid source material into at least one filtration cassette so as to recover a permeate fluid for disposal, reuse, further filtration, or as a target product; and
  recovering a retentate stream for disposal, reuse, further filtration, or as a target product, wherein the at least one filtration cassette comprise at least one assembly, wherein the at least one assembly comprises:
    a multilaminate array of sheet members of generally rectangular and generally planar shape, each sheet having a first end and a second end longitudinally opposite the first end and a thickness, wherein the sheet members comprise in sequence in said array a first retentate sheet, (a first filter sheet, a permeate sheet, a second filter sheet, and a second retentate sheet)$_n$, wherein each of the first filter sheet, the permeate sheet, and the second filter sheet members in said array have at least one fluid opening at the first end thereof, and at least one fluid opening at the second end thereof, wherein the first end fluid opening(s) of the array are in register with one another and the second end fluid opening(s) of the array are in register with one another, and wherein n=1, 2, 3, 4, 5, 6, 7, 8, 9, 10, or more, wherein the first and second retentate sheets have at least one channel opening therein, each channel opening extending longitudinally between the first end fluid opening(s) and the second end fluid opening(s) in the array and wherein the at least one channel opening is open through the entire thickness of the first and second retentate sheets to permit a fluid to contact the adjacent filter sheets, and wherein the first and second retentate sheets are bonded to the adjacent filter sheets about peripheral end and side portions thereof; and
    two assembly end plates sandwiching the multilaminate array of sheets, wherein the two assembly end plates comprise at least one fluid opening at the first end thereof, and at least one fluid opening at the second end thereof, or both, in register with the fluid openings of the array,
    wherein the at least one assembly further comprises at least one permeate passage opening at longitudinal side margin portions of the assembly(s),
  wherein the filter cassette further comprises at least one of options (I), (II), (III), or (IV), or any combination of (I)-(IV):
    (I) a cap positioned on at least a portion of the first end fluid opening(s) or at least a portion of the second end fluid opening(s), or both, of a permeate pack, wherein the permeate pack comprises the first filter sheet, the permeate sheet, and the second filter sheet members, wherein the cap is positioned proximate to the channel openings of the first and second retentate sheets;
    (II) the fluid openings at the first end, the fluid openings at the second end, or both the fluid openings at the first and second end, are cut as an irregular pentagon having a "V" positioned proximate to the channel openings of the first and second retentate sheets;

(III) a first permeate screen spacer positioned between the first filter sheet and the permeate sheet or a second permeate screen spacer positioned between the second filter sheet and the permeate sheet, or both, wherein the permeate screen spacer(s) comprise fluid openings in register with the fluid openings of the array;

(IV) the permeate sheet comprises a metal matrix or other reinforced porous material of requisite thickness.

Other aspects and advantages of the invention will be more fully apparent from the ensuing disclosure and appended claims.

BRIEF DESCRIPTION OF THE FIGURES

FIG. 4D illustrates an alternative filter sheet (20) having "notched" fluid openings (9), which are stiffer than the traditional square or rectangular cut-out openings.

FIG. 4E is a close-up of the notched cut-out openings of FIG. 4D.

FIG. 5A is a perspective view of FIG. 4A showing a first filter sheet (20), a permeate sheet (30), and a second filter sheet (20) having capped (22) fluid openings (9).

FIG. 5B is a cross-sectional view of FIG. 4A along A-A' showing the installed cap (22).

FIG. 5C is a picture of an assembly of the filter cassette of the present invention with the installed caps.

FIG. 17A is the top view of a permeate pack comprising a stainless steel permeate screen.

FIG. 17B is a close-up of the permeate passage opening of FIG. 17A, which enables permeate to enter the permeate sheet in the "z" axis.

DETAILED DESCRIPTION

Figure 1:
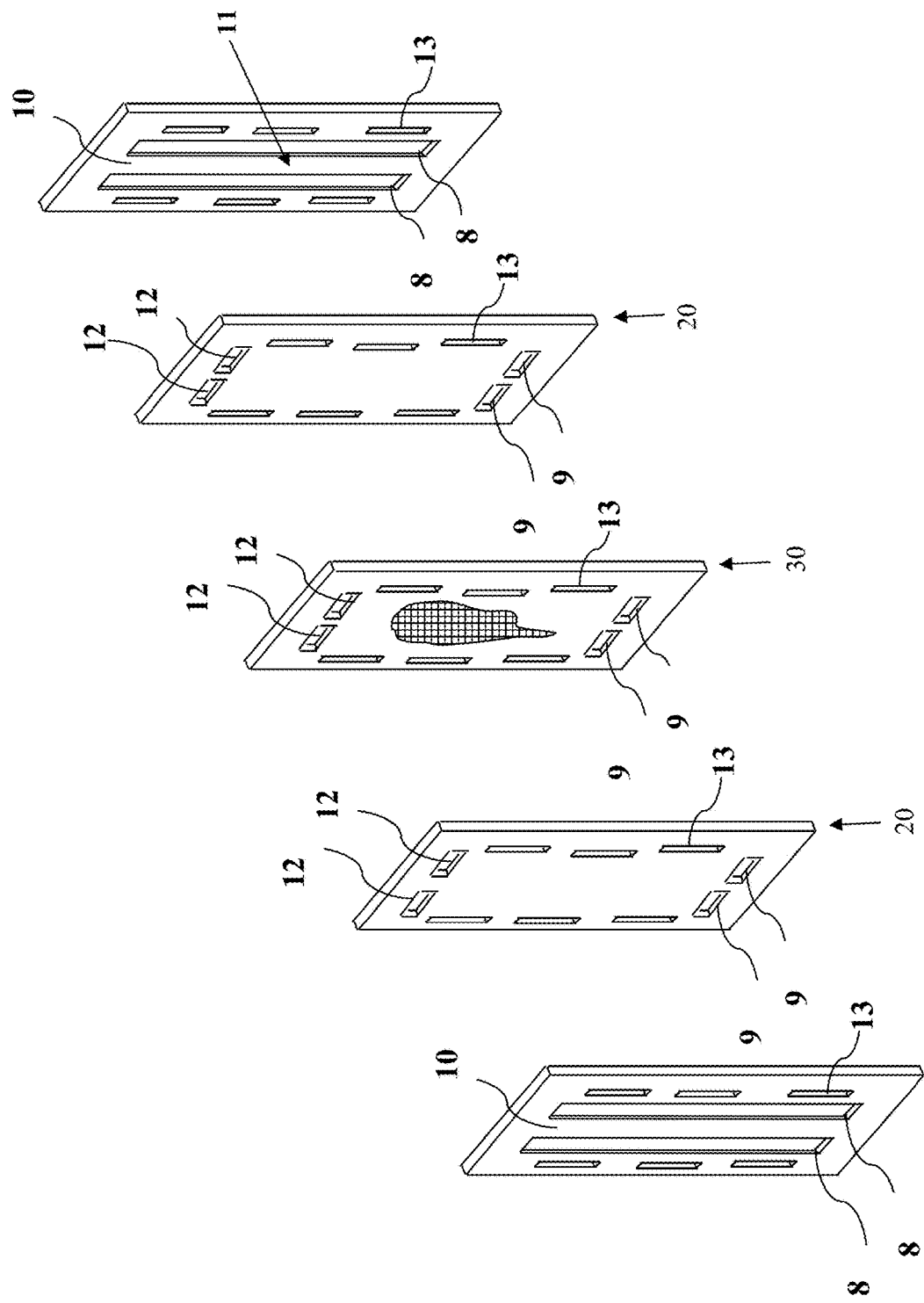
FIG. 1 is a perspective view of the assembly of sheets in a cross-flow filtration cassette of the prior art, wherein the assembly end plates are not shown.

While not to be construed as limiting, the terms used herein have the following definitions unless indicated otherwise.

The term "cross-flow filtration cassette" refers to a type of filter module or filter cassette that comprises two end plates and at least one assembly of sheets positioned therebetween, wherein the at least one assembly of sheets comprises at least one porous filter element across a surface of which the liquid source material to be filtered is flowed in a tangential flow fashion, for permeation through the filter element of selected component(s) of the liquid source material. In a cross-flow filter, the shear force exerted on the filter element by the flow of the liquid source material serves to oppose accumulation of solids on the surface of the filter element. Cross-flow filters include macrofiltration, microfiltration, ultrafiltration, and nanofiltration, and low pressure forward osmosis, or reverse osmosis membranes.

As used hereinafter, the term "sheet member" or "sheet" refers to the various laminae of the assembly of sheets, the "assembly" or "assembly of sheets" comprising a stack of generally planar sheet members forming an operative mass transfer unit positioned between assembly end plates. The assembly comprises assembly end plates, permeate sheets, filter sheets, retentate sheets, and optionally permeate screen spacer sheets, coupled to one another in such manner as to permit flow of the fluid to be separated through the flow channel(s) of the device, for mass transfer involving passage of the permeate through the filter sheets, and retention of the retentate on the side of the filter sheet opposite the side from which the permeate emerges. The term "compressible" in reference to the retentate sheet or other structural feature or sheet member of the present invention means that such component or member is compressively deformable by application of load or pressure thereon.

As defined herein, "caps" or "capped" sheets include the placement of a generally "U" shaped object at the first end fluid opening (9), at the second end fluid opening (12), or both the first end fluid (9) and second end fluid (12) openings, so that the structural integrity of the filter and permeate sheets at said openings does not degrade, bend and/or delaminate as a result of exposure to the turbulent fluid. The caps provide additional rigidity to the filter and permeate sheets at said openings, thus substantially ensuring that the retentate flow channel entrances (and exits) remain open and substantially parallel to one another in the assembly, thus allowing for stable retentate flow rates and easier cleaning of the filter cassettes. Advantageously, when both ends are capped (i.e, both the first end fluid (9) and second end fluid (12) openings), the assembly's robustness, i.e., ability to withstand permeate backpressure without rupturing, is significantly improved, making it more suitable in an industrial environment because of the increased robustness.

For the purposes of the instant application, a "module" or a "cassette" or a "filter cassette" "cross-flow module," or a "filter module" are intended to be synonymous and the terms interchangeable.

For the purposes of the instant application, "retentate flow channel," "retentate channel," "flow channel," and "channel" are intended to be synonymous and the terms interchangeable.

"Liquid source material" or "feed," as used herein, refers to a liquid containing at least one and possibly two or more target substances or products of value which are sought to be separated and purified from other substances present in said liquid. Liquid source materials may for example be present as aqueous solutions, organic solvent systems, or aqueous/organic solvent mixtures or solutions. The liquid source material comprising the target substance can be a solid-liquid mixture or a liquid-liquid mixture.

"Target substance" as used herein refers to the one or more desired product or products to be separated from the liquid source materials. Target substances include, but are not limited to, water, non-biological materials (e.g., gypsum, minerals, metals, nanostructures, precipitates), inorganic materials, petroleum products and by-products, food and beverage products, biological substances (e.g., cells, proteins, microorganisms, antibodies, hormones, viruses, bacteria, microbes, immunoglobulins, clotting factors, vaccines, antigens, glycoproteins, peptides, enzymes, as well as small molecules such as salts, sugars, lipids, etc.), and renewable fuels and by-products of manufacturing renewable fuels (e.g., ethanol, biobutanol, glycerin, and biodiesel). The target substance can be in the permeate, in the retentate, or both. The target substance can be potable or non-potable.

Because of the dynamic nature of the separation process, a liquid source material may enter a flow channel, but a retentate will emerge from said flow channel as permeate is separated therefrom. Retentate can be recirculated and mixed with new liquid source material and further separation effectuated. For the purposes of the present application, to simplify the explanation of the invention, the term "fluid" will be used to correspond to a liquid source material, diluted source material, a retentate, a permeate, or any combination thereof, as readily understood by the person skilled in the art.

For the purposes of the instant application, "cauterization" of the permeate sheet, for example metal matrix permeate sheet, occurs when the laser cuts through the metal and the fibers disrupted by the cut are heat bonded or welded to one another.

A generalized embodiment of an assembly of sheets is shown in FIG. 1, comprising a multilaminate array of sheet members of generally rectangular and generally planar shape with main top and bottom surfaces and a first end and a second end along the longitudinal axis, wherein the sheet members include in sequence in said array a first assembly end plate (not shown), a first retentate sheet (10), a first filter sheet (20), a permeate sheet (30), a second filter sheet (20), a second retentate sheet (10), and a second assembly end plate (not shown), wherein each of the assembly end plates, permeate sheet members, and filter sheet members in said array have at least one fluid cutout opening (9) at a first end thereof, and at least one fluid cutout opening (12) at opposite second end thereof, with permeate passage openings (13) at longitudinal side margin portions of the sheet members. Each of the first and second retentate sheets (10) have at least one flow channel opening (8) therein, extending longitudinally between the first end fluid (9) and second end fluid (12) cutout openings of the permeate and filter sheets in the array. The sheets are bonded (e.g., heat, compression, adhesive, heat, or combination thereof) to adjacent sheets about peripheral end and side portions thereof, with their fluid cutout openings and permeate passage openings in register with one another, wherein a central portion of each of the sheets is unbonded to permit fluid to flow along the channel opening(s) from the first end fluid (9) to the second end fluid (12) cutout openings such that permeate is in contact with, and flows through, the filter sheet (20) to the permeate sheet (30), and to permit the permeate in the permeate sheet (30) to flow towards the permeate passage openings (13) to the permeate outlet (not shown in FIG. 1). For ease of disclosure, the first end fluid (9) and second end fluid openings (12) (and permeate passage openings (13)) are illustrated in the Figures as generally rectangular or square (see, e.g., FIG. 4A) or as an irregular pentagon (see, FIG. 4D). It should be appreciated by the person skilled in the art that the shape of the fluid openings (and permeate passage openings) are not limited to rectangles or squares or irregular pentagons and can include any other reasonable shape for the flow of fluid therethrough, as readily understood by the person skilled in the art.

Figure 2:
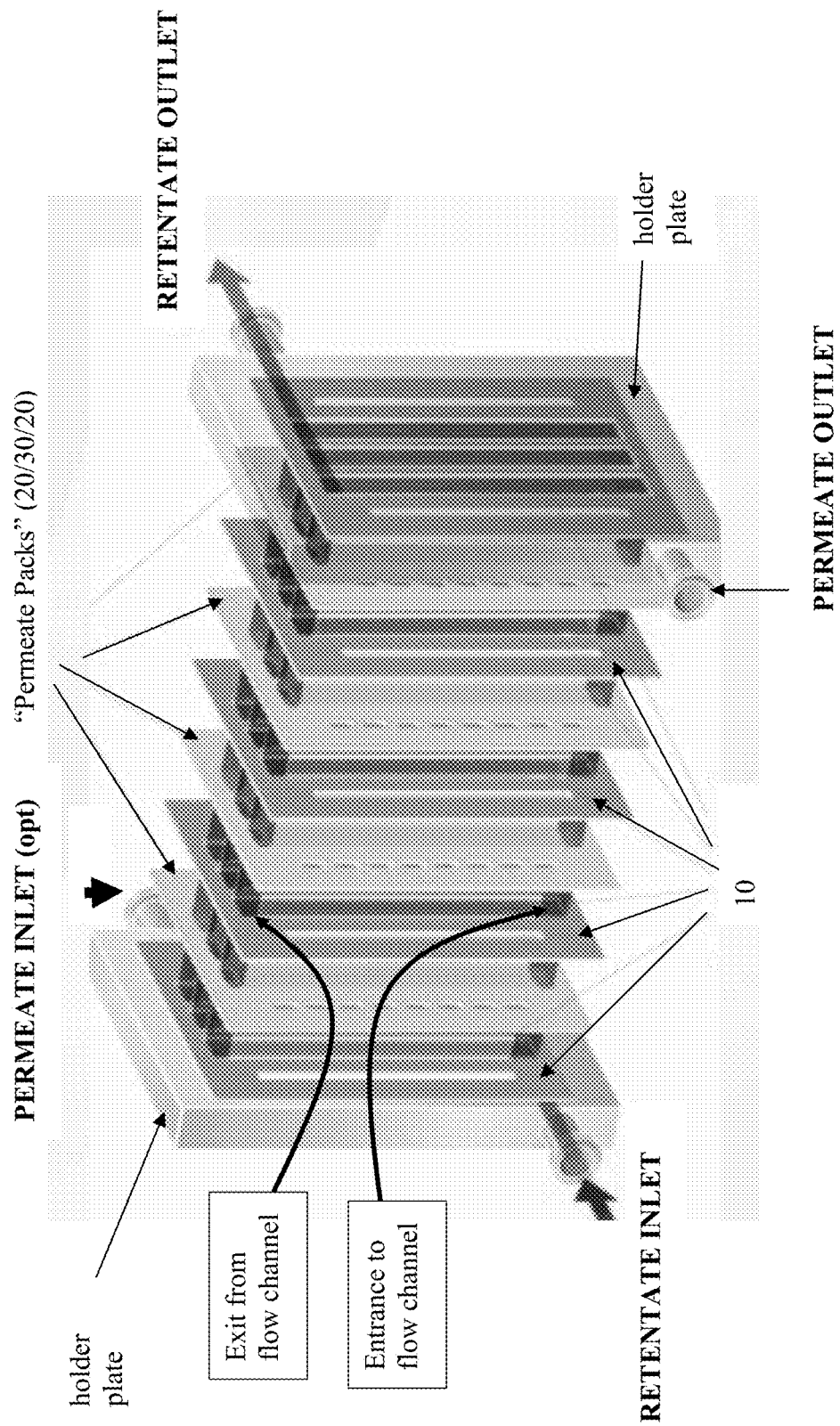
FIG. 2 illustrates the flow pattern of the fluid through an assembly of sheets between holder plates with transversely located first end fluid and second end fluid openings, a permeate outlet, and an optional permeate inlet.

The assembly of sheets (including assembly end plates) are mounted between holder plates, which may be provided with suitable ports, to produce a filtration cassette, for introduction of liquid source material to be separated in the filtration cassette, and for discharge or withdrawal of filtrate/permeate and retentate (see, e.g., FIG. 2). One skilled in the art can appreciate that the assembly end plates can be integrally sealed to the laminae of sheets. If the integrally sealed assembly comprises assembly end plates made of plastic or polymeric materials or sheets, the units may provide the function of a disposable device for single or multiple use.

As illustrated in FIG. 1, the retentate sheet (10) is provided with a plurality of transversely spaced-apart, longitudinally extending ribs or partitions (11), such ribs or partitions being of substantially the same height and substantially parallel to one another to define a series of flow channel (8) openings between the partitions, wherein the flow channels (8) extend longitudinally between the position of the first end fluid (9) to the second end fluid (12) cutout openings. The adjacent filter sheets (20) may optionally be bonded to the ribs or partitions (11) using, for example, a flexible resilient adhesive bonding medium, such as a urethanes, epoxy or silicone adhesive sealant medium, e.g., applied in a "bead" along the entire circumference of the flow channel opening (8). It should be appreciated that the number of flow channels (8) can be 1, 2, 3, 4, 5, 6, 7, 8, 9, 10, 11, 12, 13, 14, 15, 16, 17, 18, 19, 20, or more, as readily determined by the person skilled in the art. As a result of the stacking of the sheets in the assembly, each retentate flow channel (8) preferably has its' own respective entrance and exit (see, e.g., FIG. 2), for example, where liquid source material enters at one end and retentate exits at the other end of the flow channel. It should be appreciated by the person skilled in the art that the flow in the filtration cassette can be reversed, for example during cleaning, whereby what was the entrance and exit of the flow channel is now the exit and entrance, respectively. In dynamic flow, there is preferably a gel layer that builds on the filter sheet surface exposed in the retentate flow channel. The optimal gel layer conditions (depth and density) are found by manipulating pressure and shear along the retentate flow channel (8) and hence across the surface of the filter sheet (20).

The permeate sheet (30) may constitute a foraminous material of from about 80 to about 300 mesh size. Examples of permeate sheets include, but are not limited to, woven materials, nonwoven materials, molded porous materials, or combinations thereof. For example, the foraminous permeate sheets may comprise a woven polymeric mesh including, but not limited to, polyester, polypropylene, nylon, fluorocarbon polymers such as polytetrafluoroethylene, polyethylene, polysulfone, polyethersulfone, polyetherimide, polyimide, polyvinylchloride, ceramics, e.g., oxides of silicon, zirconium, and/or aluminum, and composites comprising one or more of such materials. Alternatively, the permeate sheets may comprise a nonwoven material, of suitable foraminous character. In one embodiment, the permeate sheet is a reinforced polymer composite.

The filter sheets (20) may be of any suitable porous, malleable materials including, but not limited to, woven or non woven materials, stretched materials, irradiated materials, wet phase inversion materials, dry phase inversion materials, cast materials, or combinations thereof. Examples of materials include, but are not limited to, cellulose, polyphenylene oxide, polysulfone, cellulose nitrate, cellulose acetate, regenerated cellulose, polyether amide, polyphenylene oxide/polysulfone blends, mixed esters of cellulose, polyamide, polyvinylidene difluoride, thin film composite (TFC), poly acrylonitrile, mixed ester cellulose, polypropylene, polytetra fluoro ethylene, polyester, polycarbonate, high density polyethylene, and polyethersulfone. The filter sheets can include woven or non-woven materials.

Presently, the filtration cassettes of the prior art are only rated for temperatures less than about 60° C., while many industrial processes are carried out at temperatures greater than 60° C. The United States Food Safety and Inspection Service (FSIS) define the danger zone where bacteria can grow as roughly 5 to 60° C. Processing above 60° C. is therefore beneficial. Towards that end, preferably, the assembly end plates, filter sheets, the retentate sheets, and permeate sheets (and the optional permeate screen spacer sheets) are made of materials which are adapted to accommodate high temperatures and chemical sterilants, so that the interior surfaces of the filtration cassette are able to withstand higher processing temperature and/or extreme pH and may be steam sterilized and/or chemically sanitized solutions for regeneration and reuse, as "steam-in-place" and/or "sterilizable in situ" structures, respectively. Steam sterilization typically may be carried out at temperatures on the order of from about 121° C. to about 130° C., at steam pressures of 15-30 psi, and at a sterilization exposure time typically on the order of from about 15 minutes to about 2 hours, or even longer. Further, the ability to operate the filter cassette described herein using higher temperature fluid is advantageous. It is well known in the art that there can be benefits to working with a higher temperature fluid, as will be discussed below. Alternatively, the entire cassette may be formed of materials which render the cassette disposable in character.

Although not shown, an assembly of sheets comprises two assembly end plates, one on each side of the stacked array shown in FIG. 1. The assembly end plates may be formed of any suitable materials of construction, including, for example, stainless steel or other suitable metal, or polymers such as polypropylene, polysulfone, polyetherether ketone and polyetherimide. A filtration cassette comprises at least one assembly of sheets as well as a holder inlet plate and a holder outlet plate, wherein the holder plates function as the fluid manifold and compress the assembly of sheets therebetween. Preferably the assembly end plates comprise polymeric material while the holder plates comprise stainless steel or other suitable materials such as metals, polymers, or any combination thereof.

Figure 3A:
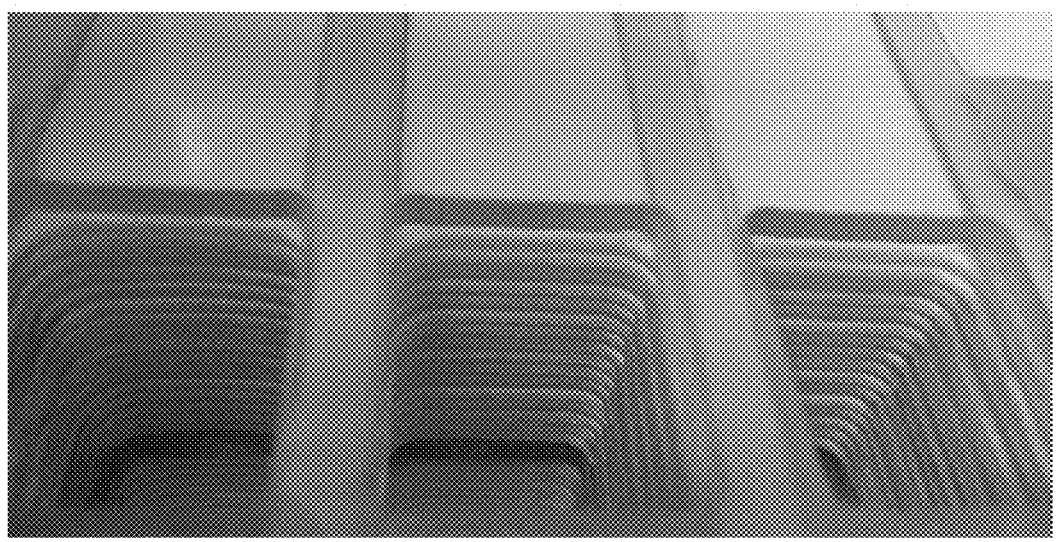
FIG. 3A is a picture of an assembly of an unused filter cassette of the prior art, showing the stiff and parallel retentate channel entrances.
Figure 3B:
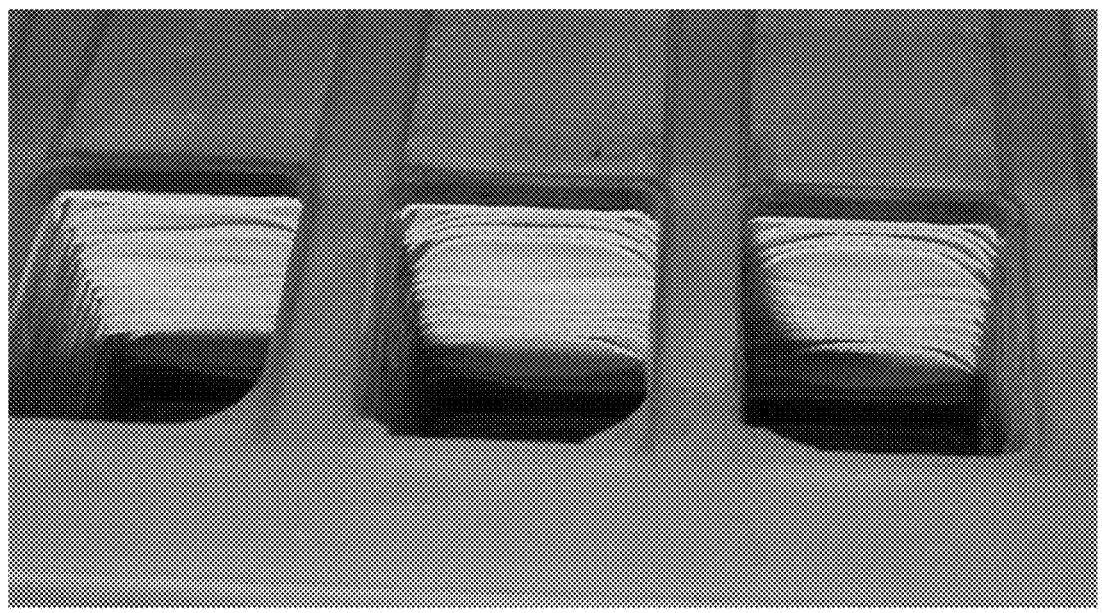
FIG. 3B is a picture of an assembly of a used filter cassette of the prior art nearing the end of its utility, showing blocked retentate channel entrances and a lack of parallelism to the adjacent channel.

As introduced hereinabove, disadvantageously, the sheet material at the leading edge of the first end fluid (9) and/or the second end fluid (12) cutout openings of the prior art can degrade in several ways during heavy use over time, wherein the turbulence associated with the fluid at the retentate flow channel (8) entrances results in deformation of the sheet material and subsequence blocking at said entrances, as shown in FIG. 3B (e.g., compare FIG. 3A to FIG. 3B). Further, for example, in cellulosic or fluid streams with fibrous components, fibers and other irregular solids in the fluid can bridge the flow channel entrances. Once a few fibers and other irregular solids are caught in the prior art design there is cascade effect whereby they rapidly accumulate until the entrance to the retentate flow channel is no longer open.

As introduced herein, the assembly of sheets comprises a "base sequence" of sheets positioned between two assembly end plates (hereafter designated by the symbol "E"), wherein the base sequence of sheets in the assembly comprise, consist of, or consist essentially of, a first retentate sheet (hereafter designated by the symbol "R"), a first filter sheet (hereafter designated by the symbol "F"), a foraminous permeate sheet (hereafter designated by the symbol "P"), and a second filter sheet ("F"). The assembly can have the general formula $E/R/(F/P/F/R)_n/E$, wherein n=1, 2, 3, 4, 5, 6, 7, 8, 9, 10, or more depending on the circumstances. In a first aspect of the invention, the combination of sheets F/P/F, or the "permeate pack," are "capped" at the first end fluid (9) cutout opening, the second end fluid (12) cutout opening, or both. An illustrative array of sheets in the assembly may for example feature the sheet sequence $E/R(\hat{\ }F/P/F\hat{\ }R)_n/E$, wherein the capped F/P/F sheets are separated from the retentate sheets by the ^ symbol.

Referring to FIGS. 4A-4C and FIGS. 5A-5C, the caps or reinforcement at the first end fluid openings (9) can be seen. As shown in the figures, the first end fluid openings (9) have four sides. Fluid that enters the inlet is directed down the first end fluid opening (9) and some of the fluid makes an approximately 90° turn down the very first flow channel entrance provided at first retentate sheet "R." The remainder of the fluid continues along the first end fluid opening (9) past a capped F/P/F combination and some of the fluid makes an approximately 90° turn down the next retentate flow channel entrance provided by the next retentate sheet "R," and so on. Notably, the cap is on at least a portion of the first end fluid opening (9) proximate to the retentate flow channel entrance so that some of the fluid can make the approximately 90° turn into the retentate flow channel entrance, while minimizing damage to the F/P/F combination (e.g., as shown in FIG. 3B). The other three sides of the F/P/F combination of sheets is fused, bonded, or attached to the retentate sheet "R."

Figure 4A:
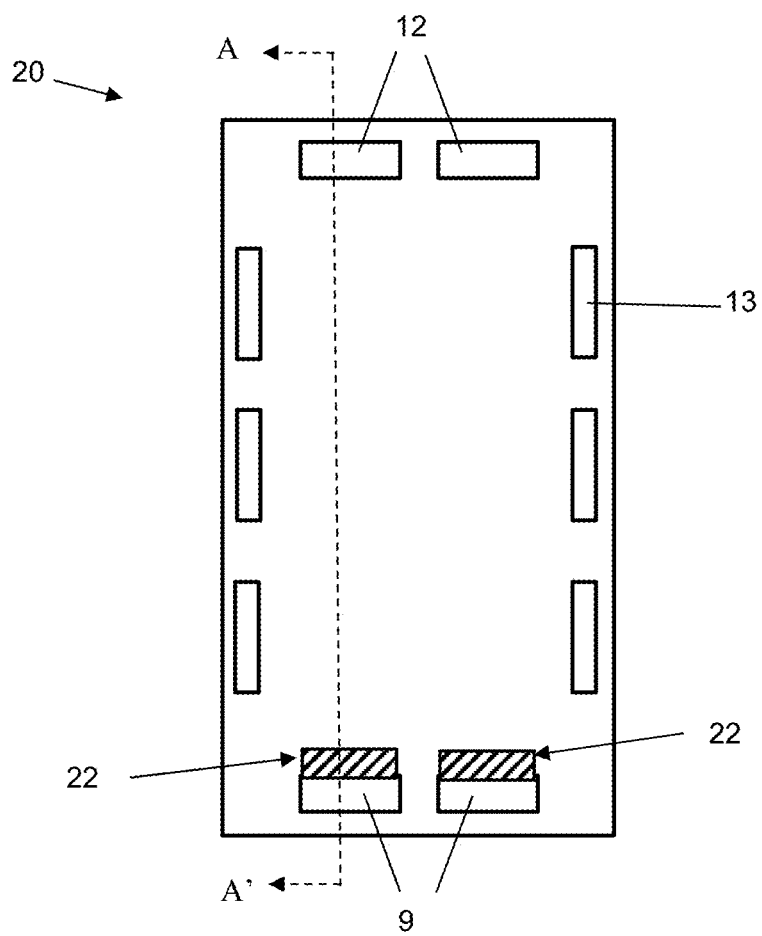
FIG. 4A is a top plan view of a permeate pack having capped (22) fluid openings (9) and an indication of a cross-section along A-A'.
Figure 4B:
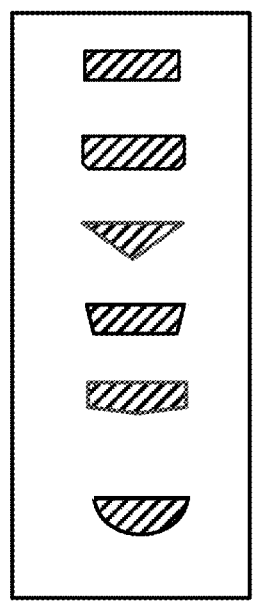
FIG. 4B illustrates alternative cap (22) shapes.
Figure 4C:
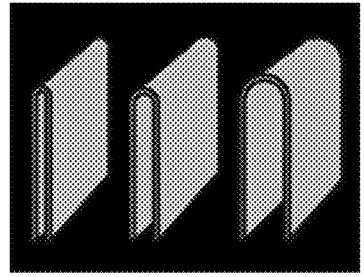
FIG. 4C illustrates a generic "U-shaped" cap.
Figure 5D:
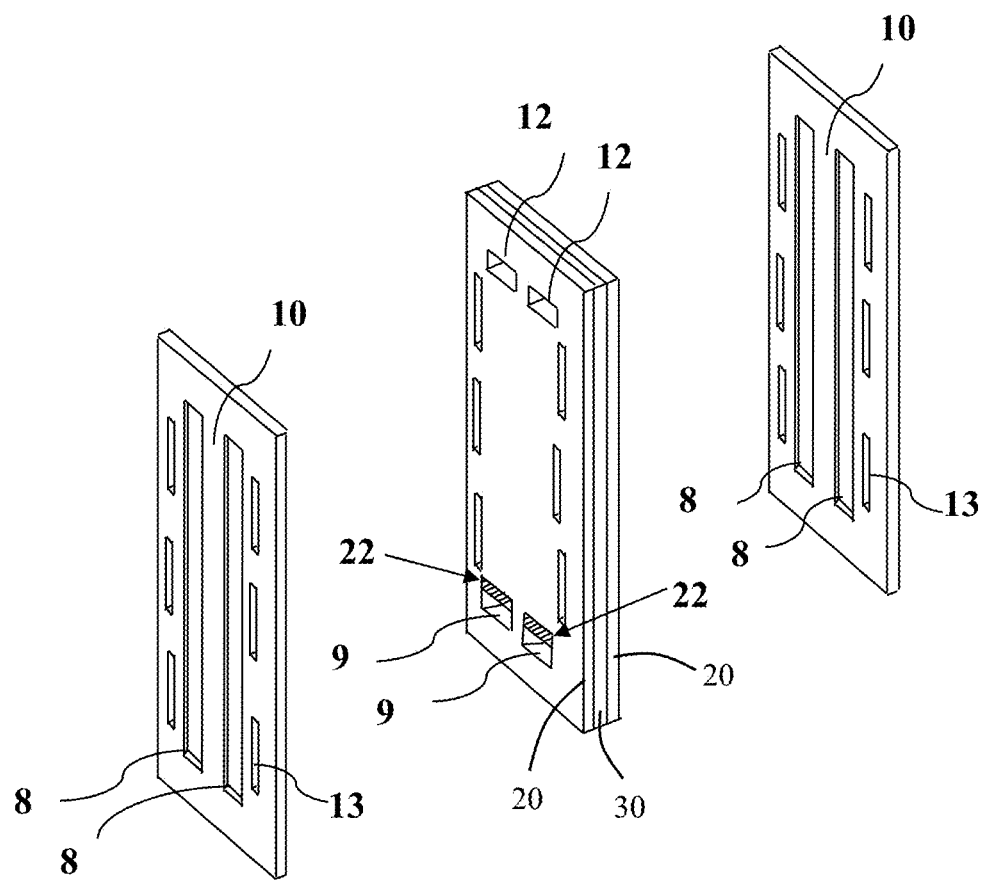
FIG. 5D is a perspective view of the assembly of the present invention, including the installed caps, wherein the assembly end plates are not shown.

FIG. 5A is a perspective view of FIG. 4A showing a first filter sheet (20), a permeate sheet (30), and a second filter sheet (20) having capped (22) first end fluid openings (9). FIG. 5B is a cross-sectional view of FIG. 4A along A-A' showing the first filter sheet (20), a permeate sheet (30), and a second filter sheet (20) having capped (22) first end fluid openings (9). The cap (22) has the general cross-section of a "U" (see for example, FIG. 4C), and transverses the F/P/F sheets, i.e., the permeate pack, through the first end fluid openings (9) of the F/P/F combination such that one leg of the "U" at least partially overlaps a first side (25) (see, FIG. 5B) of the first filter sheet (20) and the other leg of the "U" at least partially overlaps a second side (26) (see, FIG. 5B) of the second filter sheet (20), with the permeate sheet (30) positioned therebetween. A photo of the cap on the F/P/F sheets can be seen in FIG. 5C. FIG. 4A illustrates a top plan view of either the first side of the first filter sheet or the second side of the second filter sheet, wherein only one leg of the "U" cap can be seen. Referring to FIG. 4B, it should be appreciated that the at least partial overlap of the cap (22) (i.e., the legs of the "U") is not limited to a rectangular shape but can be rounded, be triangular, be trapezoidal, as well as other shapes easily envisioned by those skilled in the art. FIG. 5D is a perspective view of the components of an assembly of the first aspect, including the installed caps (22) over the F/P/F sheets, wherein the assembly end plates are not shown. It should be appreciated that instead of the U-shaped cap, the first end fluid opening (9) of the F/P/F sheets can be stiffened using rigid adhesives, solid sheets of rigid materials such as plastic or metals, coatings, tape, radio frequency sealing or melting the polymeric components of the permeate pack in the immediate area of the flow channel entrances, however, stainless steel "U" caps provided a superior outcome for the rectangular fluid openings (9, 12).

Figure 13A:
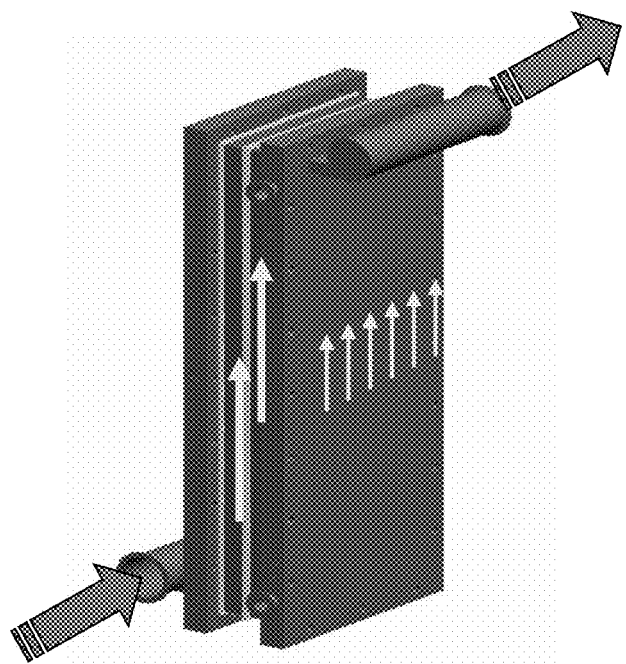
FIG. 13A illustrates an example of parallel flow pattern of the fluid through a module or cassette.
Figure 13B:
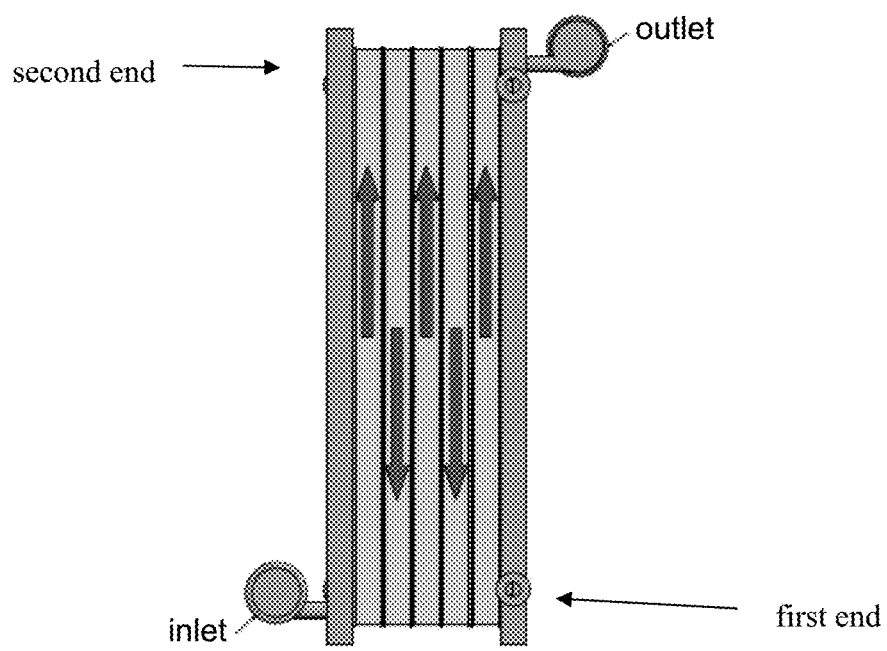
FIG. 13B illustrates an example of series flow pattern of the fluid through a module or cassette.
Figures 16A, 16B:
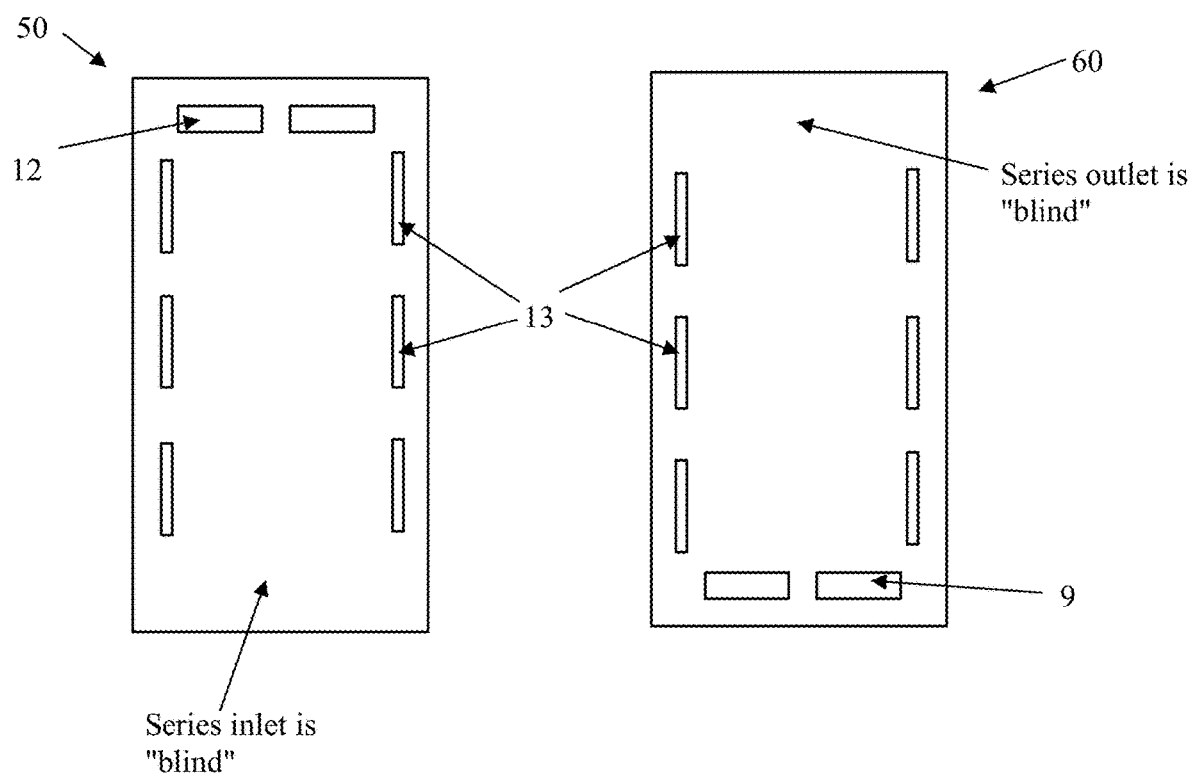
FIG. 16A is a top view of a series inlet plate.
FIG. 16B is a top view of a series outlet plate.

The figures show and the description describes the assembly as having caps or reinforcement only over a portion of the first end fluid openings (9) that are in register with one another for the parallel flow of fluid (see, e.g., FIG. 13A). It should be appreciated that with parallel flow, the fluid flows in one direction within an assembly and between assemblies in the filter cassette. That said, the series flow of fluid is contemplated, wherein you can have series flow within an assembly, between assemblies, or both (see, e.g., FIG. 13B wherein the fluid flows in a first direction (i.e., from the first end to the second end) along the flow channels (8) in one assembly and make a 180 degree turn to flows in a second direction (i.e., from the second end to the first end) along flow channels (8) of the next assembly in a serpentine fashion). In the case of series flow, the caps are placed on some of the first end fluid openings as well as some of the second end fluid openings, depending on the nature of the series flow (i.e., whether series within the assembly or between assemblies or both), as readily understood by the person skilled in the art. It is further understood that caps may be present on both the first end and the second end fluid openings to improve the assembly's robustness and/or retain functionality in the case of need to reverse the fluid flow direction. With the series flow filter cassette, additional layers in the array are necessary to ensure that the fluid follows a serpentine path through the filter cassette. For example, the series inlet plate (50) in FIG. 16A and the series outlet plate (60) in FIG. 16B can be used to redirect the flow of fluid. An example of a series flow filter cassette, wherein the series flow is between assemblies, is HIP/RG/$A_1$/RG/SI/RG/$A_2$/RG/SO/RG/$A_1$/RG/HOP, where HIP is the holder inlet plate (having a first end inlet), RG is a rubber gasket, $A_1$ and $A_2$ are assemblies as described herein, SI is a series inlet plate (e.g., (50) in FIG. 16A), SO is a series outlet plate (e.g., (60) in FIG. 16B), and HOP is the holder outlet plate (having a second end inlet). The assemblies $A_1$ and $A_2$ can have the sheet sequence $E/R/(F/P/F/R)_n/E$, wherein n=1, 2, 3, 4, 5, 6, 7, 8, 9, 10, 11, 12, 13, 14, 15, 16, 17, 18, 19, 20, or more. As described above, the caps are placed at a second end in $A_1$ (see, FIG. 16A), and then in $A_2$, the caps are placed at the first end (see, FIG. 16B), and so on. Because of the series inlet and the series outlet plates, the fluid flows in a serpentine fashion from the first assembly to the second assembly to the third assembly and so on. It is noted that there may still be parallel flow within each assembly, or the assembly may be constructed to have series flow within the assembly, as readily understood by the person skilled in the art. Further, it should be appreciated that the value of "n" may be the same as or different from one another from assembly to assembly, as readily understood by the person skilled in the art. It is thought that the caps are even more important in the series apparatus because of the 180° turn that the fluid will have to make, resulting in even greater turbulence within the filter cassette.

Figure 14A:
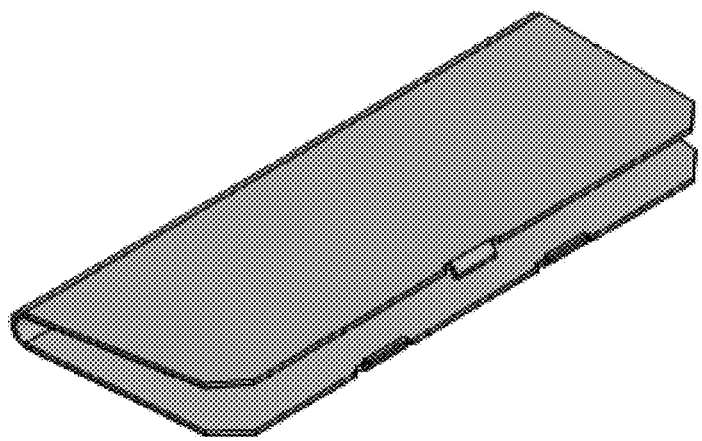
FIG. 14A is a perspective view of an alternative embodiment of the cap including clips.
Figure 14B:
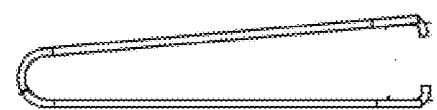
FIG. 14B is a side view of the cap of FIG. 14A.
Figure 14C:
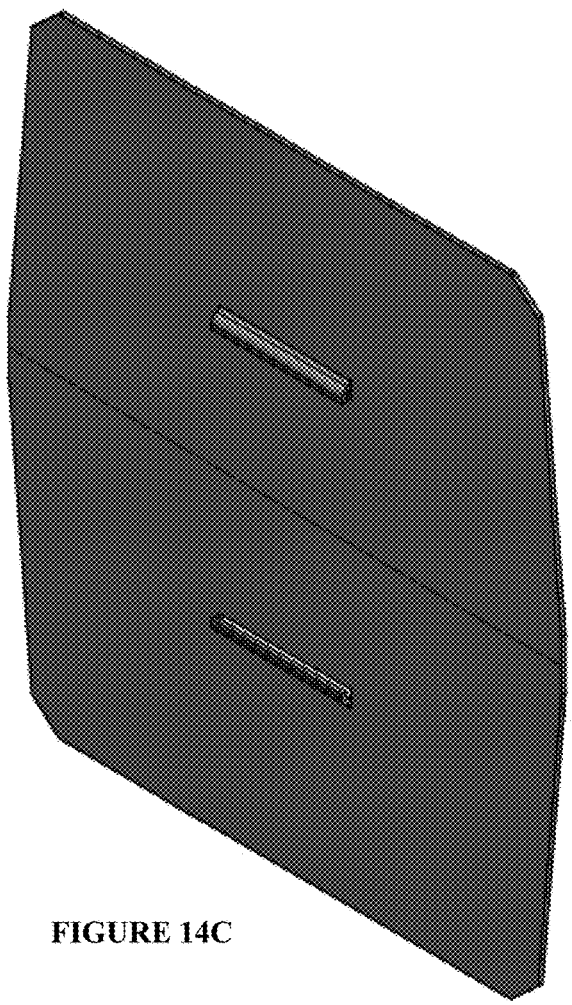
FIG. 14C is a perspective view of another alternative embodiment of the cap including clips, wherein the cap is not folded.
Figure 14D:
FIG. 14D is a side view of the cap of FIG. 14C, illustrating an embodiment of the clips.
Figure 14E:
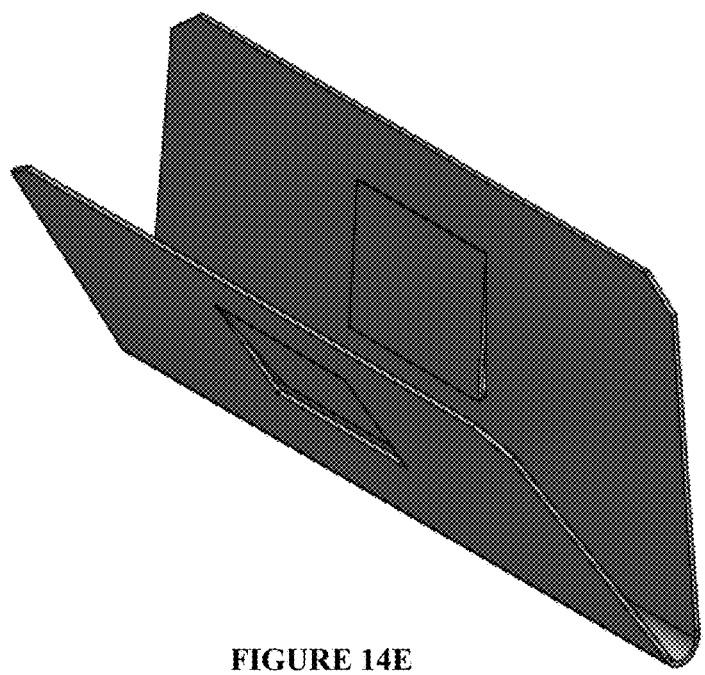
FIG. 14E is a perspective view of another alternative embodiment of the cap including "hooks."
Figure 14F:
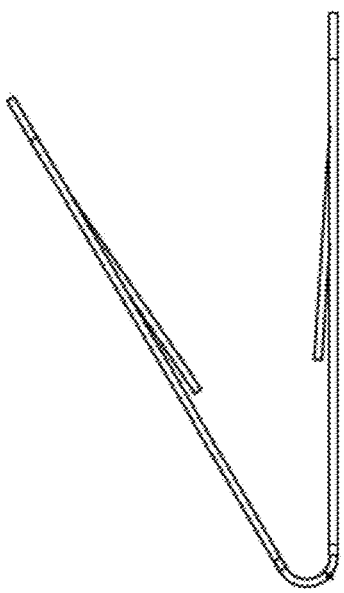
FIG. 14F is a side view of the cap of FIG. 14E, illustrating an embodiment of the "hook."
Figure 14G:
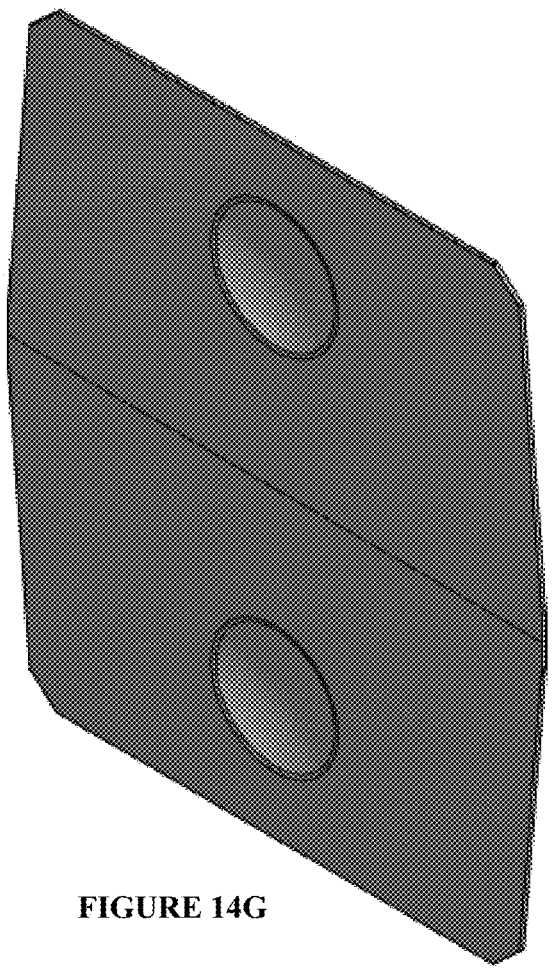
FIG. 14G is a perspective view of another alternative embodiment of the cap including curved "dimples."
Figure 14H:
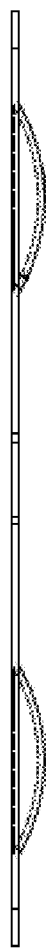
FIG. 14H is a side view of the cap of FIG. 14G.
Figure 14I:
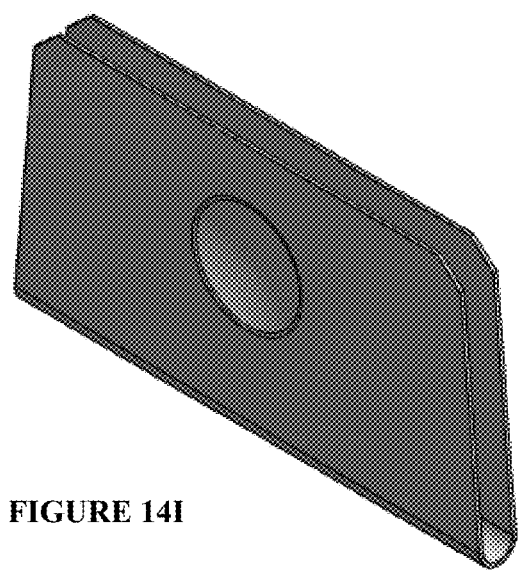
FIG. 14I is a perspective view of the folded cap of FIG. 14G.
Figure 14J:
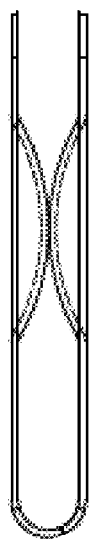
FIG. 14J is a side view of the folded cap of FIG. 14I.
Figure 14K:
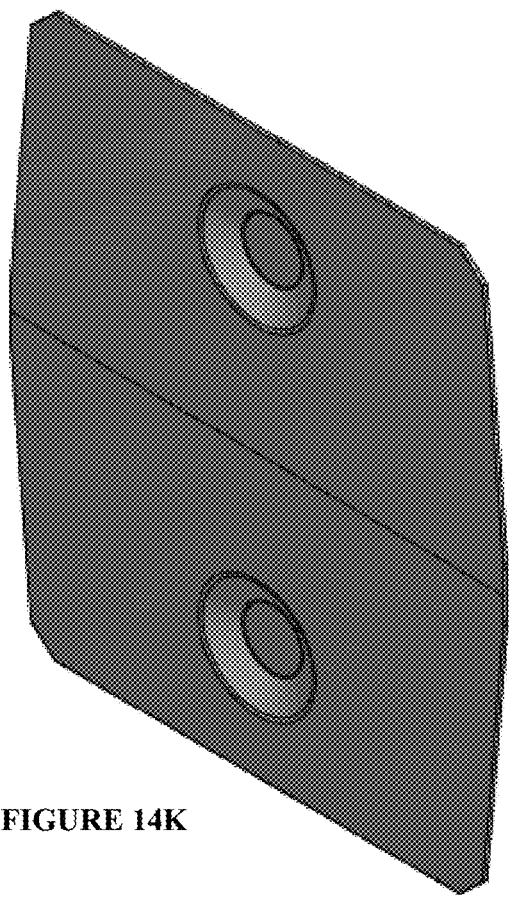
FIG. 14K is a perspective view of another alternative embodiment of the cap including flat "dimples."
Figure 14L:
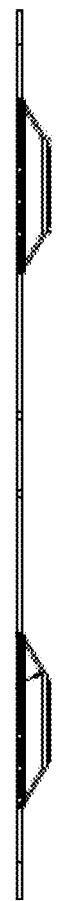
FIG. 14L is a side view of the cap of FIG. 14K.
Figure 14M:
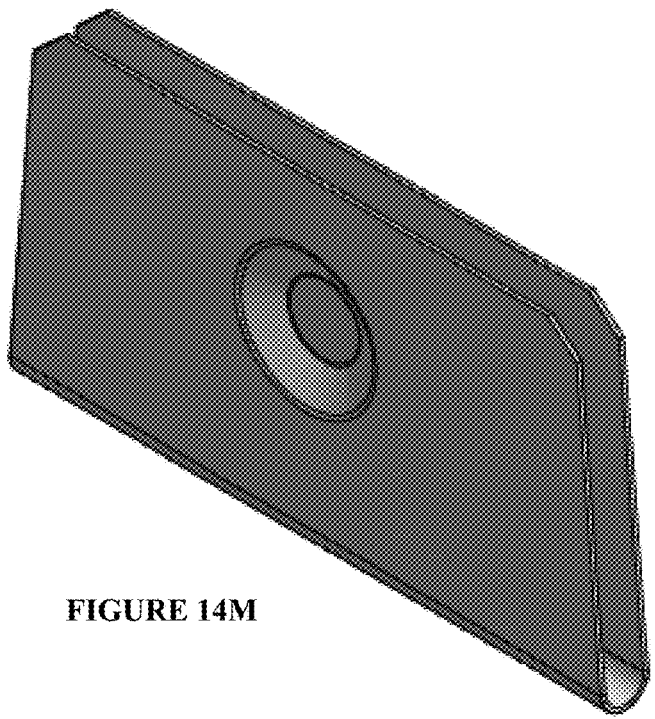
FIG. 14M is a perspective view of the folded cap of FIG. 14K.
Figure 14N:
FIG. 14N is a side view of the folded cap of FIG. 14M.

The caps can be made of any material that does not interact or is reactive with fluids being introduced into the filtration cassette. Such material may include, but is not limited to, metals, ceramics, polymeric materials, and combinations thereof. Preferred metals include silver, copper, nickel, and stainless steel. Preferred polymeric material includes thermoset plastics such as amino, epoxy, phenolic, and unsaturated polyesters. The polymeric materials can be molded to have a smooth or textured inside, with or without inside features designed to more substantially bond with the F/P/F permeate pack, and are preferably resistant to higher temperatures and varied pH values. An advantage of using polymeric caps include, but is not limited to, thermal coefficients that are similar to those of the permeate sheet which corresponds to similar expansion and contraction rates. With regards to the stainless steel caps, the inside can be smooth or textured (e.g., chemical etch or sandblasted), with or without inside features designed to more substantially bond with the F/P/F permeate pack. The inside features designed to assist with the bonding to the permeate pack include, but are not limited to, at least one clip (see, for example, FIGS. 14A-14B and FIGS. 14C-14D), at least one "hook" (see, FIGS. 14E-14F), or at least one dimple (see, FIGS. 14G-14N). It should be appreciated by the person skilled in the art that the caps can be some combination of the options described herein. The caps can be scored or the radius deliberately weakened on the inside so that the cap collapses fully when compressed, as understood by the person skilled in the art. Further, it should be appreciated that the shape of the dimples and hooks are not limited to circles and squares, respectively, but can be any shape that ensures that the caps bond with the permeate pack materials.

Figure 15A:
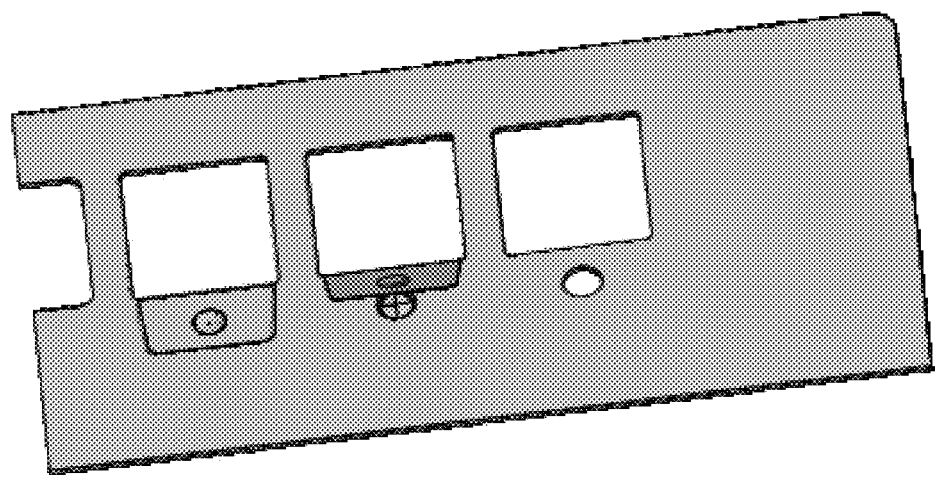
FIG. 15A illustrates the positioning of the cap of FIG. 14G or 14K at the fluid inlets and/or outlets, including the dimples on the cap and a hole in the permeate pack so that the dimples can be glued or welded together through the hole.
Figure 15B:
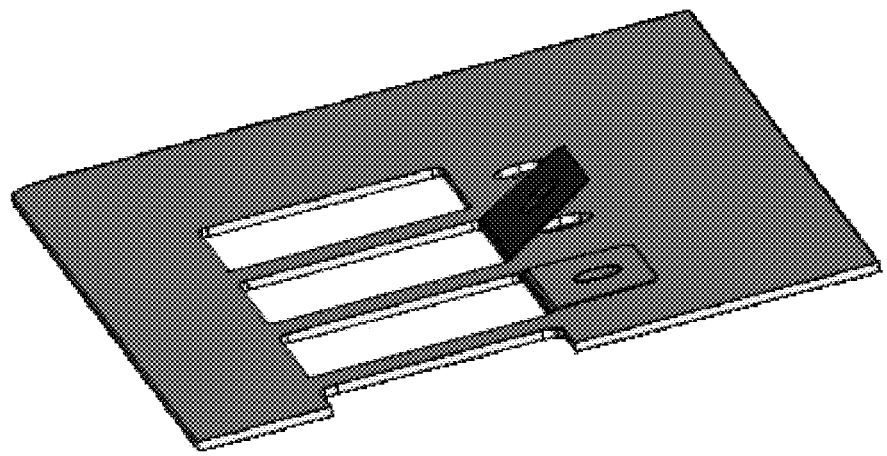
FIG. 15B illustrates another view of the cap of FIG. 14G or 14K and 15A.

The assembly of sheets described herein is manufactured as follows. The permeate packs, i.e., the F/P/F combination, are die cut and bonded. Thereafter, the cap is secured to the permeate pack, either by glue or other bonding material or by welding together. For example, a controlled amount of bonding material (e.g., epoxy, polyurethane) can be dispensed into the cap, for example using a syringe, and then the cap is positioned and clamped on the permeate pack as described herein. The "controlled amount" corresponds to an amount of bonding material such that when the cap is clamped there is a substantially full spread beneath the cap to cover the cap's surface but not so much as to have excess bonding material squeezing out from beneath the cap. In one embodiment, the cap has at least one dimple (see, FIGS. 14G-14N), wherein a hole is provided in the permeate pack so that the dimples can be glued or welded together through the hole. In another embodiment, the cap has at least one hook (see, FIGS. 14E-14F), wherein a hole matching the shape of the hook is provided in the permeate pack such that the indents of the hook would be caught in said hole so that the cap cannot be pulled out. In still another embodiment, the cap's open ends can extend through an opening cut into the permeate pack and be bonded, welded, or otherwise sealed together to bond the open ends of the U-shaped cap together and form an integral seal (see, e.g., FIGS. 15A and 15B). Thereafter, the permeate pack can be attached to the retentate sheets as understood by the person skilled in the art. It is to be understood that this is only one embodiment of positioning the caps on the permeate packs and is not intended to limit the invention in any way. Alternative methods are readily envisioned by the person skilled in the art.

Figure 6A:
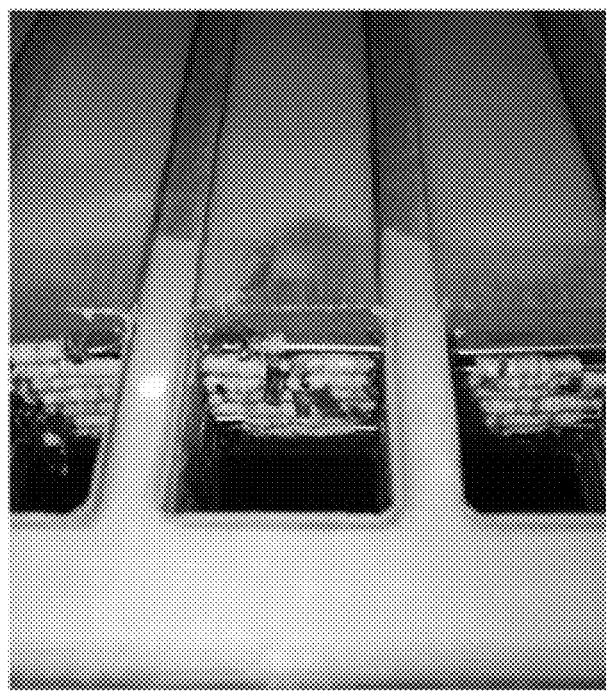
FIG. 6A is a picture of an assembly of a used filter cassette with the installed caps before cleaning.
Figure 6B:
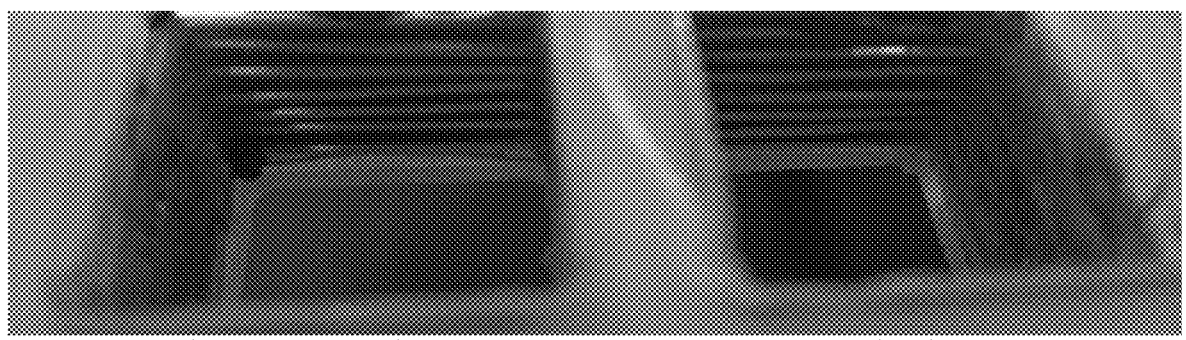
FIG. 6B is a picture of an assembly of the used filter cassette with the installed caps after cleaning.

Advantageously, the cap or reinforcement of the first aspect over the F/P/F sheets ensures that the entrances at the retentate flow channels do not fold or collapse over time due to the turbulence associated with the fluid entering the cassette. This ensures that the entrances to the retentate channels are not blocked and that the adjacent filter sheets are substantially parallel to one another, thus increasing the working surface area of retentate channels, resulting in a higher flux rate than without the caps. Moreover, the caps minimize the accumulation of fibers and other irregular solids at the entrances. Because the clips are so rigid and are substantially parallel to one another, particulate material that is larger than the entrance to the flow channels cannot enter the flow channels and foul up the filter sheets. Further, the filter cassettes are easier to clean, as can be seen in FIGS. 6A (before cleaning) and 6B (after cleaning), such that the lifespan of the filter cassette with the caps is longer than the lifespan of a filter cassette without the caps, under the same operating conditions. The cleaning of the filter cassettes described herein can be more aggressive because of the inclusion of the caps. Another advantage is that the filter cassettes with caps are more resistant to higher temperatures than any of the filter cassettes of the prior art. Initial temperature ratings of the filter cassettes with caps, as described herein, are 85° C., but temperatures in excess 121° C. have been tested with success. Accordingly, the ability to utilize the modules that comprise the caps or reinforcement of the first aspect at higher temperatures reduces processing costs. Accordingly, in one embodiment, liquid source materials having temperatures in a range from about 1° C. to about 130° C. can be introduced into the filter cassettes of the first aspect. Other temperature ranges contemplated include about 50° C. to about 130° C., about 50° C. to about 85° C., greater than 60° C. to about 130° C., and greater than 60° C. to about 85° C. It is especially preferred that the temperature range be above 60° C. when the source material is edible. It should be appreciated that if the liquid in the liquid source material has a freezing point below zero that the filter cassettes described herein can be used for separation of the target substance at temperatures below zero, so long as the temperatures are above the freezing point of the liquid.

It should also be appreciated by the person skilled in the art that filter cassettes without caps may be retrofitted with caps, for example, using the procedures described herein.

In a second aspect, the fluid opening (9), and optionally the fluid opening (12) (not shown), is cut in a shape other than a rectangle. As shown in FIGS. 4D and 4E, the fluid opening (9) is cut in the shape of an irregular pentagon, having a "V" substituted at one side of a rectangle, to be positioned proximate to the channel entrances of the retentate sheets. The advantage associated with the irregular pentagon fluid opening is the increased stiffness at the leading edge relative to that of a traditional rectangular fluid opening, which tends to fold over as a result of the turbulent fluid (see, e.g., FIG. 3B). Without being bound by theory, it is thought that the irregular pentagon opening of FIGS. 4D and 4E will add stiffness and minimize the force of the fluid flow through the channel and as such, will not fold over in the same manner as the rectangular opening. It should be appreciated that the irregular pentagon-shaped fluid opening may be capped, similar to that described in the first aspect. Further, the filtration cassette may be designed to be in parallel, wherein the irregular pentagon-shaped fluid opening is always at the first end (9), or the filtration cassette may be in series wherein the irregular pentagon-shaped fluid opening is at the first end (9) and the second end (12), depending on the series arrangement, as described hereinabove in the first aspect.

In a third aspect, the assembly comprises at least one permeate screen spacer (hereafter designated by the symbol "S"). An illustrative assembly may for example feature the sheet sequence E/R/(F/S/P/S/F/R)$_n$E, wherein n=1, 2, 3, 4, 5, 6, 7, 8, 9, 10, 11, 12, 13, 14, 15, 16, 17, 18, 19, 20, or more. Another illustrative assembly may for example feature the sheet sequence E/R/(F/S/P/F/R)$_n$E, wherein n=1, 2, 3, 4, 5, 6, 7, 8, 9, 10, 11, 12, 13, 14, 15, 16, 17, 18, 19, 20, or more. Still another illustrative assembly may for example feature the sheet sequence E/R/(F/P/S/F/R)$_n$E, wherein n=1, 2, 3, 4, 5, 6, 7, 8, 9, 10, 11, 12, 13, 14, 15, 16, 17, 18, 19, 20, or more. Yet another illustrative assembly may for example feature the sheet sequence E/R/(F/P/S/P/F/R)$_n$/E, wherein n=1, 2, 3, 4, 5, 6, 7, 8, 9, 10, 11, 12, 13, 14, 15, 16, 17, 18, 19, 20, or more.

Figure 7A:
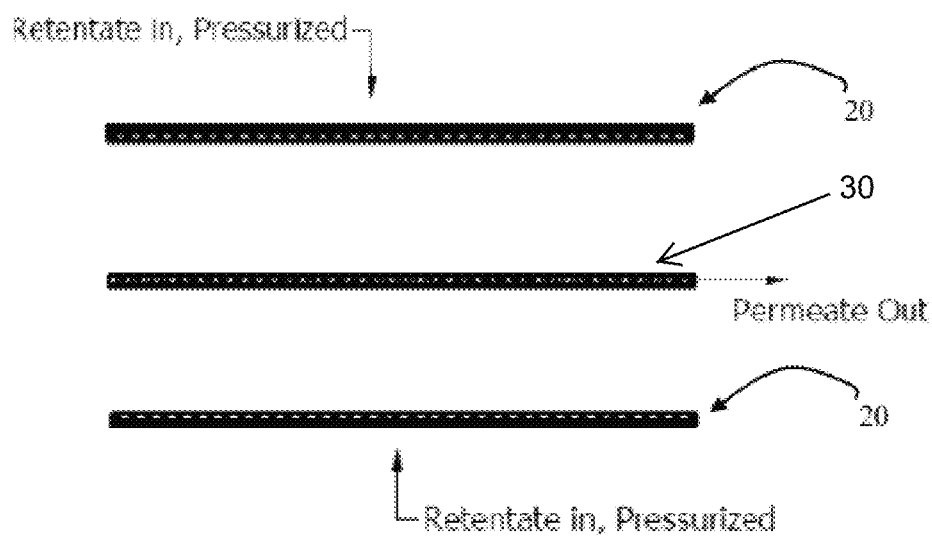
FIG. 7A is a cross section of the first filter sheet (20), the permeate sheet (30), and the second filter sheet (20) of the prior art.
Figure 7B:
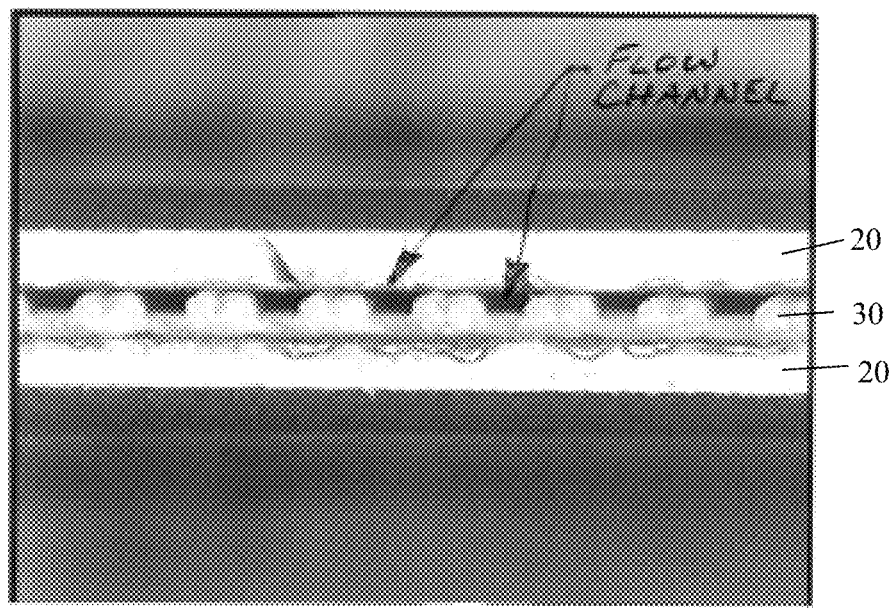
FIG. 7B is a picture of flow channels of a permeate sheet (30) between two filter sheets.
Figure 8:
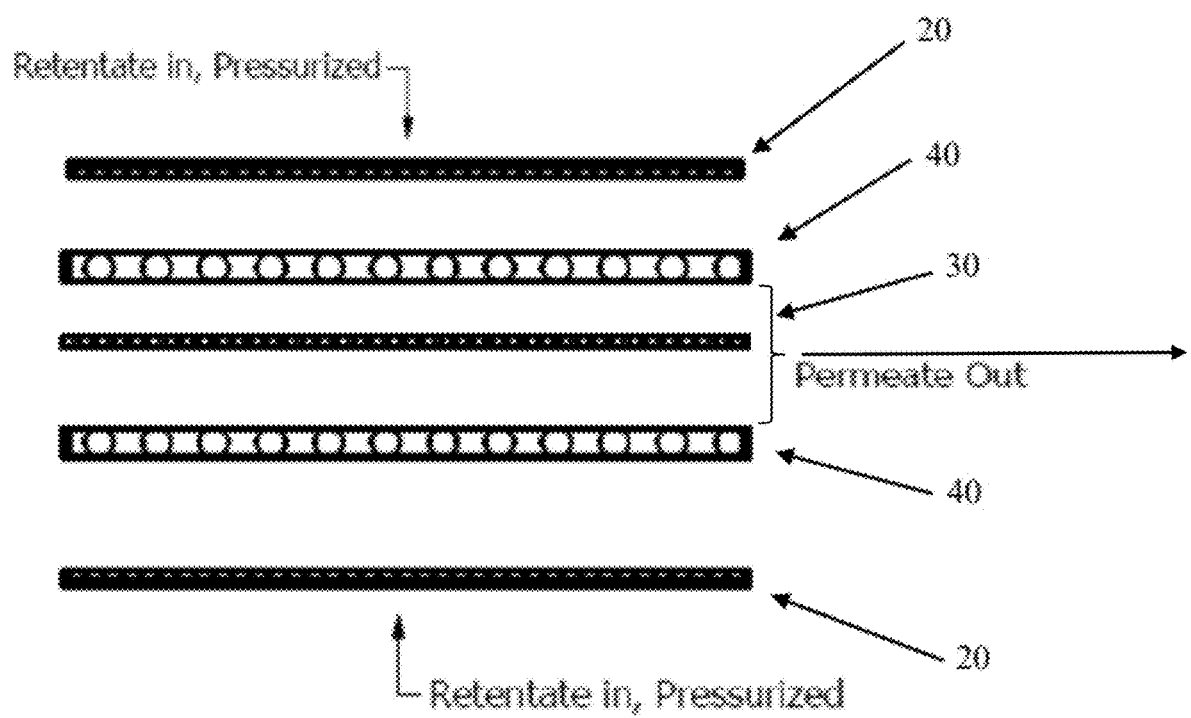
FIG. 8 is a cross section of the first filter sheet (20), the first permeate screen spacer (40), the permeate sheet (30), the second permeate screen spacer (40), and the second filter sheet (20) described herein.

FIG. 7A illustrates the prior art F/P/F permeate pack structure, wherein the filter sheet is on either side of a permeate sheet. During filtration the fluid is under pressure (e.g., from about 2 to about 300 psi) to incentivize permeate to pass through the filter sheet (20) and exit via the permeate sheet (30) through the permeate flow channels (see, e.g., (13) in FIG. 1). Disadvantageously, some inherent throughput restriction results from the interfacial tortuosity of the permeate sheet material being in direct contact with most filter sheets. This occurs wherever materials on one layer cover what would otherwise be open area on the adjacent layer(s). Pressurization of fluid from either side of the permeate sheet causes some flex of the filter sheet further into the open area thus worsening the throughput restriction. For example, by including the first and second permeate screen spacer between the filter sheet and the permeate sheet, to yield the combination F/S/P/S/F (see, FIG. 8), permeate restriction between the two filter sheets can be minimized and lateral flow can be enabled. This is true for the other illustrative assemblies disclosed herein. Without being bound by theory, it is thought that the inclusion of the permeate screen spacer decreases the aggregate area of blinding from contact points, hence minimizing the permeate restriction and enabling the lateral flow (see, e.g., FIG. 9B). Further, the inclusion of the permeate screen spacer increases the stiffness, minimizing retentate flow channel bulging, thus retaining uniform flow characteristics at higher pressure and shear.

Figure 9A:
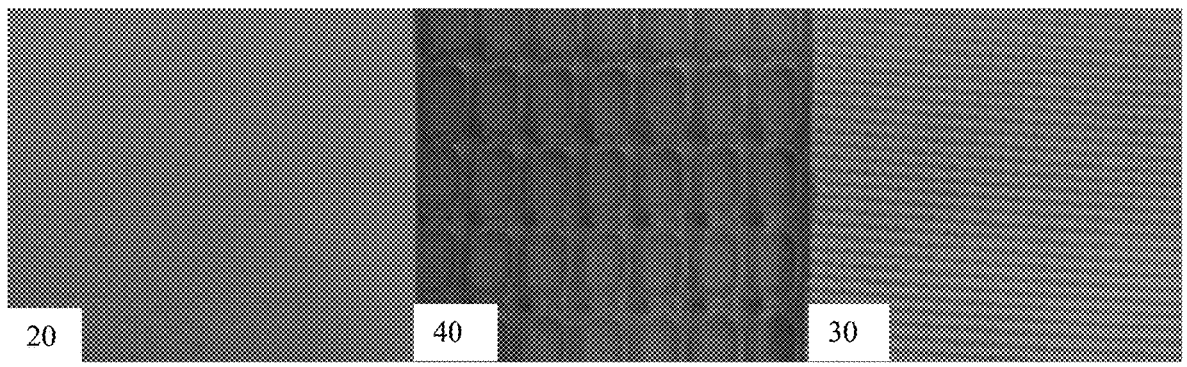
FIG. 9A is a photo of an embodiment of the filter sheet (20), an embodiment of the permeate screen spacer (40), and an embodiment of the permeate sheet (30) as described herein.
Figure 9B:
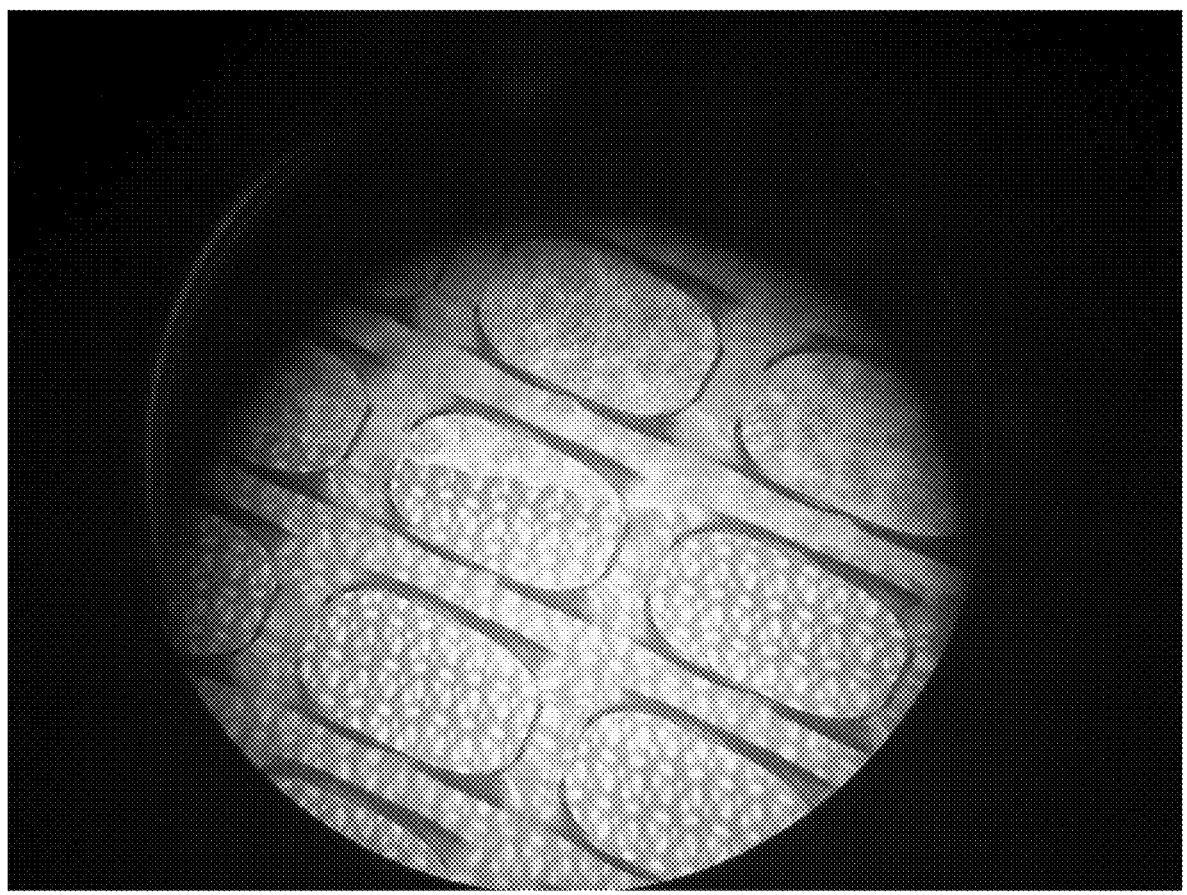
FIG. 9B is a photo of a permeate screen spacer between a permeate sheet and a filter sheet.
Figure 10A:
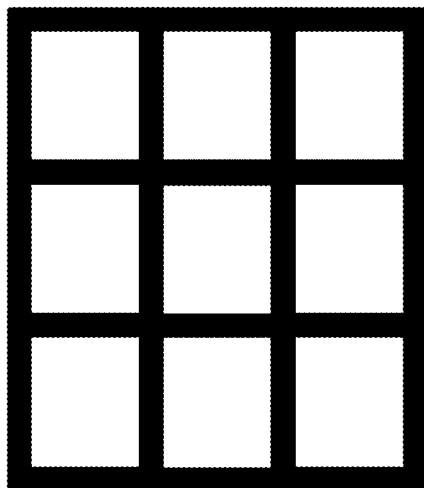
FIG. 10A is an embodiment of the pattern of the permeate screen spacer.
Figure 10B:
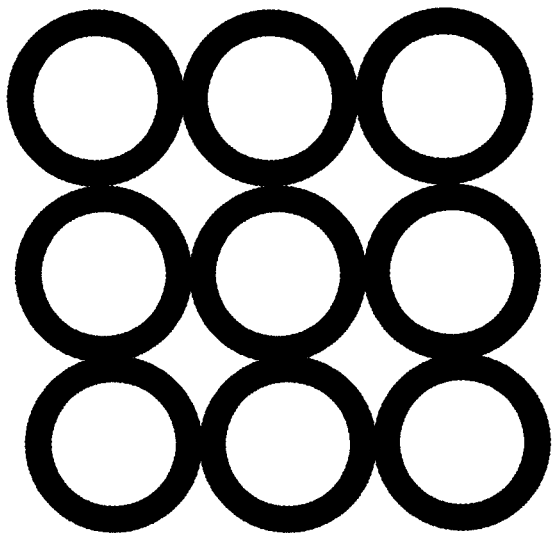
FIG. 10B is another embodiment of the pattern of the permeate screen spacer.
Figure 10C:
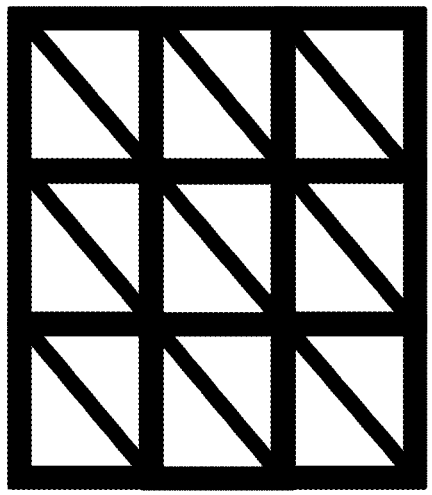
FIG. 10C is another embodiment of the pattern of the permeate screen spacer.
Figure 10D:
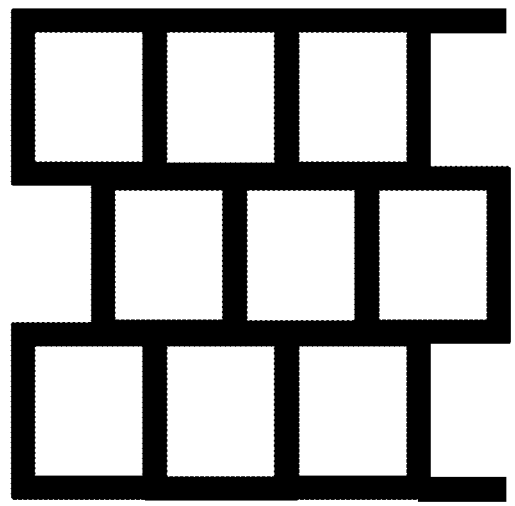
FIG. 10D is another embodiment of the pattern of the permeate screen spacer.

In one embodiment, the permeate screen spacer (40) has large open areas, e.g., on the order of about 20% to about 80%, preferably about 35% to about 70%, even more preferably about 50% to about 65%, relative to the smaller open area of the filter sheet (20), which has minimal open area (e.g., in a range from about 1% to about 5%) and the permeate sheet (30), wherein the permeate sheet has open area in a range from about 30% to about 60%, preferably about 40% to about 50% (see, e.g., FIG. 9A). Alternatively, the permeate screen spacer can have open areas of about 20% to about 35% or about 70% to about 80%. The pattern on the permeate screen spacer (40) is not limited to that shown in FIG. 9A but can include patterns such as those shown in FIGS. 10A-D, as well as other patterns easily envisioned by the person skilled in the art. The screen of the permeate screen spacer, i.e., the "non-open" areas, may be rigid, semi-rigid, or flexible, depending on the use, as readily determined by the person skilled in the art. The screen of the permeate screen spacer can comprise any suitable material of construction including, but not limited to, natural or synthetic polymers, silicone, ceramics, metals, polymeric fluorocarbons, compatible alloys, or any combination thereof. For example, polymers such as polypropylene, polyethylene, polysulfone, polyethersulfone, polyetherimide, polyimide, polyvinylchloride, polyester, etc.; nylon, silicone, urethane, regenerated cellulose, polycarbonate, cellulose acetate, cellulose triacetate, cellulose nitrate, mixed esters of cellulose, etc.; ceramics, e.g., oxides of silicon, zirconium, and/or aluminum; metals such as stainless steel; polymeric fluorocarbons such as polytetrafluoroethylene; and compatible alloys, mixtures and composites of such materials. The permeate screen spacer may be woven or non-woven. It should be appreciated that the permeate screen spacers in the assembly may be the same as or different than the other permeate screen spacers. Further, the permeate screen spacers in one assembly may be the same as or different than the permeate screen spacers in another assembly.

Figure 11:
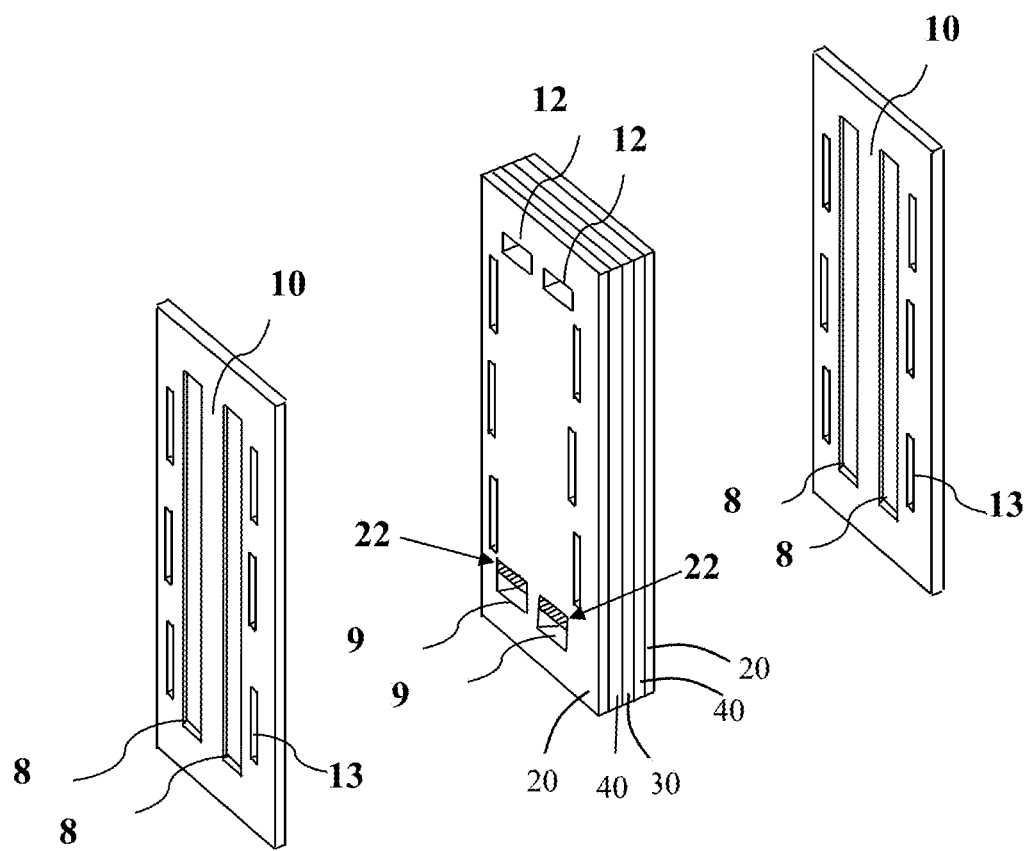
FIG. 11 is a perspective view of the assembly of the present invention, including the installed caps (22) and the permeate screen spacers (40), wherein the assembly end plates are not shown.

Optionally, the assembly comprising at least one permeate screen spacer can have: (i) "caps" at the fluid openings per the first aspect, as illustrated in FIG. 11; (ii) irregular pentagon-shaped fluid cut-out openings per the second aspect; or (iii) both (i) and (ii). When capped, an illustrative assembly of the third aspect may for example feature the sheet sequence E/R(^F/S/P/S/F^R)$_n$/E, wherein the capped F/S/P/S/F sheets are separated from the retentate sheets by the ^ symbol. Another illustrative assembly of the third aspect may for example feature the sheet sequence E/R(^F/S/P/F^R)$_n$/E, wherein the capped F/S/P/F sheets are separated from the retentate sheets by the ^ symbol. Still another illustrative assembly of the third aspect may for example feature the sheet sequence E/R(^F/P/S/F^R)$_n$/E, wherein the capped F/P/S/F sheets are separated from the retentate sheets by the ^ symbol. Yet another illustrative assembly of the third aspect may for example feature the sheet sequence E/R(^F/P/S/P/F^R)$_n$/E, wherein the capped F/P/S/P/F sheets are separated from the retentate sheets by the ^ symbol. The caps are identical in material and manufacture as the caps discussed hereinabove in the first aspect.

Figure 12:
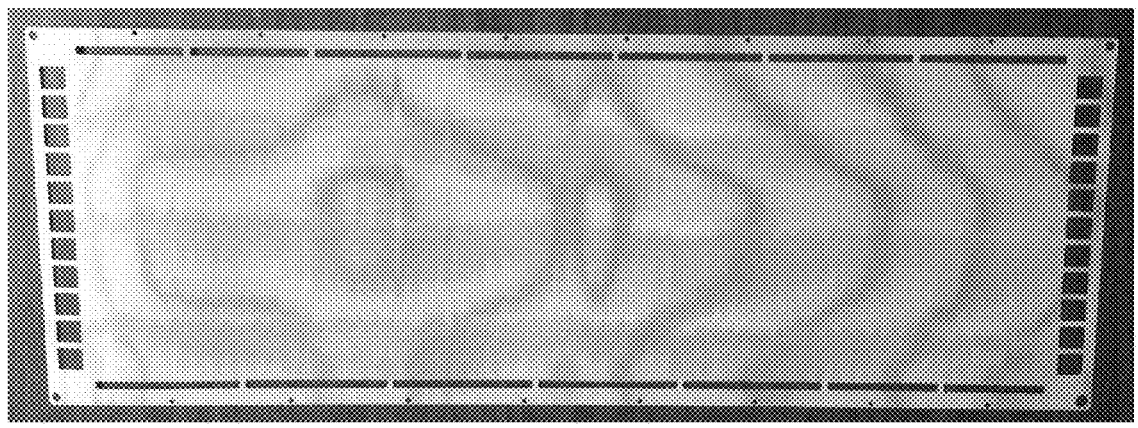
FIG. 12 is a photo of a stainless steel permeate sheet.

In a fourth aspect, at least one permeate sheet (30) in the filtration cassette described herein can comprise a metal matrix, or other stiffened or reinforced porous material. For the purposes of this aspect, reference to a metal matrix hereinafter does not foreclose the use of another stiffened or reinforced porous material instead. Preferably, the permeate sheets (or the permeate sheets with at least one permeate screen spacer) have enough structural integrity or stiffness to ensure channels between the filter sheets (20) on either side of the permeate sheet (30) exist, thus ensuring that the filter sheets remain separate and substantially parallel to one another, which will improve the flux rate. For example, the permeate sheet (30) may comprise metal material, e.g., a stainless steel material such as an indexed stainless steel material that has been diffusion bonded at the wire intersections (see, e.g., FIG. 12). Indexing is a technique where the weave is rotated to increase strength with minimal loss in permeability. The successful use of the stainless steel permeate sheet described herein is surprising as the filtration cassettes of the prior art comprising stainless steel permeate sheets (e.g., having stainless steel fibers that would shed) always succumbed to punctures, which led to contamination of permeates or a fatal breach of filter integrity. When the permeate sheet used in the assembly is stainless steel or a reinforced porous material, the permeate sheet may also function as a retentate flow channel stiffener by improving the resistance to retentate channel flex as well as ensuring an adequate channel exit for the permeate flow. Moreover, when the permeate sheet has the requisite stiffness, the caps of the first aspect are optional. In one embodiment, the permeate sheet (30) comprises an indexed stainless steel material that is fully diffusion bonded stainless steel with all ports and edges laser cut then deburred, eliminating any stray fibers to dislodge that may damage the filter sheets (20). The added stiffness enables the retentate flow channel to retain its shape, and allows the fluid to run at a higher sheer and at higher flux rate for a longer period of time before cleaning is required. Without being bound by theory, it is expected that minimizing the number of cleanings will significantly increase the life of the product. It should be appreciated that all, or less than all, of the permeate sheets in an assembly of sheets may comprise a metal matrix, or other reinforced porous material. For example, every permeate sheet, or every second, third, fourth, etc., permeate sheet in the assembly can be a metal matrix, or other reinforced porous material. Further, it should be appreciated when the filtration cassette comprises at least two assemblies positioned between the holder plates, the assemblies may be the same as or different from one another in terms of the type and number of metal matrix (or other reinforced porous material) permeate sheets present.

An embodiment of the metal matrix permeate sheet is shown in FIGS. 17A-B. FIG. 17A is the top view of a permeate pack comprising two filter sheets with a stainless steel permeate sheet sandwiched therebetween. For the purposes of describing FIGS. 17A-B, an x, y, z axis is provided, wherein the sheets are in the x-y plane. FIG. 17B is a close-up of the permeate passage opening of FIG. 17A, which enables permeate to enter the permeate passage opening (13) along the z axis. Because the permeate passage openings in the metal matrix permeate sheet have to be cut, e.g., laser cut, and cauterized, the permeate passage opening (13) on the metal matrix permeate sheet can have a narrower width than the permeate passage opening of the filter sheet (s), the retentate sheet(s), and the assembly end plates (and optional spacer permeate screen sheet(s)). For example, the width of the permeate passage opening of the filter sheet (and retentate sheet and assembly end plates and optional spacer permeate screen sheet) is shown as "i" while the width of the metal matrix permeate sheet is shown as "j." The value of "j" is preferably between 65% and 80% of the value of "i." Without the inset, the permeation rate may be restricted due to sealing off or blinding of the edges of the permeate passage openings in the metal matrix permeate sheet following laser cutting of the permeate passage openings. With the inset, permeate can enter the permeate passage opening with less restriction along the z axis. It should be appreciated that the inset is one embodiment of the assembly comprising metal matrix permeate sheet(s). Alternatives include an assembly wherein the width of the permeate passage opening in the metal matrix permeate sheet can be equal to the width of the permeate passage opening of the other sheets in the assembly.

Accordingly, for any of the assemblies of any of the aspects described herein, the width of the permeate passage opening in the permeate sheet(s) can be less than or equal to the width of the permeate passage opening of the other sheets in the assembly, regardless of the material of the permeate sheet, wherein the other sheets in the assembly are selected from the group consisting of filter sheets, retentate sheets, permeate sheet spacers, and any combination thereof.

Another advantage associated with the use of metal matrix permeate sheet includes the ability to operate the filter cassette using higher temperature fluid. It is well known in the art that there can be benefits to working with a higher temperature fluid because the viscosity of the fluid can decrease as the temperature increases. As a result, the permeate flux passage is improved with a concomitant decrease in the energy expenditure and processing costs. Further, smaller capacity pumps can be used and heat exchangers and buffer tanks can be eliminated. Another advantage is the ability to achieve a higher percentage solids target at a higher temperature relative to that achieved at the lower temperatures of the prior art.

Still another advantage associated with the use of metal matrix permeate sheet includes a filter cassette that is suitable for sonication. Sonication is a low energy means that can be used to enhance throughput in the filtration cassette by substantially preventing occlusion or blinding of the filter sheet surface porosity as well as minimizing fouling/clogging of the retentate flow channels. The addition of a metal permeate sheet that is installed immediately under, but also in contact with filter sheets, enables uniform transmission of the sonic waves due to uniform proximity of the stainless steel permeate sheet to the filter sheets. Uniform transmission is important to functionality because too low an intensity will not sufficiently agitate, resulting in a gel layer that is too thick (i.e., not an optimal gel layer), while too high an intensity will cause a loss of sheet integrity because of physical damage, such as from acoustic cavitation. Prior art attempts at ultrasonic agitation of polymeric membrane sheets have been ineffective because the intensity needed to clean the zones furthest from the acoustic field were too great for the zones closest to the acoustic field. The advantage of the geometry described herein is that a lower intensity and a lower sonication rate can be used because each metal membrane surface in each permeate pack is being agitated during ultrasonic generation. Other advantages associated with sonication include, but are not limited to, the improvement of reaction time of chemical and biological processes because of mixing function, an increase of the gas transfer coefficient, and aerating and mixing (e.g., bubble dispersement criticality).

Accordingly, the fourth aspect described herein further relates to a method of sonicating the filtration cassette described herein, said method comprising introducing an acoustic field or wave to a filtration cassette, and generating ultrasound waves to enhance throughput in the filtration cassette and/or fouling/clogging of the retentate flow channels, wherein the filtration cassette comprises at least one assembly, wherein the at least one assembly comprises:

a multilaminate array of sheet members of generally rectangular and generally planar shape, each sheet having a first end and a second end longitudinally opposite the first end and a thickness, wherein the sheet members comprise in sequence in said array a first retentate sheet, (a first filter sheet, a metal matrix permeate sheet, a second filter sheet, and a second retentate sheet), wherein each of the first filter sheet, the metal matrix permeate sheet, and the second filter sheet members in said array have at least one fluid opening at the first end thereof, and at least one fluid opening at the second end thereof, wherein the first end fluid opening(s) of the array are in register with one another and the second end fluid opening(s) of the array are in register with one another, and wherein n=1, 2, 3, 4, 5, 6, 7, 8, 9, 10, or more, wherein the first and second retentate sheets have at least one channel opening therein, each channel opening extending longitudinally between the first end fluid opening(s) and the second end fluid opening(s) in the array and wherein the at least one channel opening is open through the entire thickness of the first and second retentate sheets to permit a fluid to contact the adjacent filter sheets, and wherein the first and second retentate sheets are bonded to the adjacent filter sheets about peripheral end and side portions thereof; and two assembly end plates sandwiching the multilaminate array of sheets, wherein the two assembly end plates comprise at least one fluid opening at the first end thereof, and at least one fluid opening at the second end thereof, or both, in register with the fluid openings of the array, wherein the at least one assembly further comprises at least one permeate passage opening at longitudinal side margin portions of the assembly(s).

The filter cassette for the sonication method can further comprise at least one of options (I), (II), or (III), or any combination of (I)-(III): (I) a cap positioned on at least a portion of the first end fluid opening(s) or at least a portion of the second end fluid opening(s), or both, of a permeate pack, wherein the permeate pack comprises the first filter sheet, the metal matrix permeate sheet, and the second filter sheet members, wherein the cap is positioned proximate to the channel openings of the first and second retentate sheets; (II) the fluid openings at the first end, the fluid openings at the second end, or both the fluid openings at the first and second end, are cut as an irregular pentagon having a "V" positioned proximate to the channel openings of the first and second retentate sheets; or (III) a first permeate screen spacer positioned between the first filter sheet and the metal matrix permeate sheet or a second permeate screen spacer positioned between the second filter sheet and the metal matrix permeate sheet, or both, wherein the permeate screen spacer (s) comprise fluid openings in register with the fluid openings of the array. Further, with regards to the filter cassette for sonication, a width of the permeate passage opening of the permeate sheet can be less than, or equal to, a width of the permeate passage opening of each of the filter sheets and retentate sheets in the multilaminate array of sheets.

A fifth aspect of the invention relates to a filtration cassette comprising at least one, two, three or four of: (a) caps or other reinforcement at the fluid openings (i.e., the first aspect); (b) the irregular pentagon-shaped fluid openings (i.e., the second aspect); (c) the permeate screen spacers (i.e., the third aspect); and (d) the stiffened permeate sheets (i.e., the fourth aspect), in any combination, as readily understood by the person skilled in the art. In other words, the filtration cassette may comprise, consist of, or consist essentially of: just one of (a), (b), (c), or (d); the combination of [(a) and (b)], [(a) and (c)], [(a) and (d)], [(b) and (c)], [(b) and (d)], or [(c) and (d)]; the combination of [(a), (b) and (c)], [(a), (b) and (d)], [(b), (c) and (d)], [(a), (c) and (d)]; or the combination of [(a), (b), (c), and (d)], depending on the chemical and physical characteristics of the permeate and the retentate, as readily understood by the person skilled in the art.

In a sixth aspect, a permeate pack is described, said permeate pack comprising at least three sheet members of generally rectangular and generally planar shape, each sheet having a first end and a second end longitudinally opposite the first end, wherein the sheet members comprise a first filter sheet, a permeate sheet, and a second filter sheet, wherein each sheet has at least one fluid opening at the first end thereof, and at least one fluid opening at the second end thereof, wherein the first end fluid opening(s) of the array are in register with one another and the second end fluid opening(s) of the array are in register with one another, wherein each sheet further comprises at least one permeate passage opening at longitudinal side margin portions of each sheet, wherein each permeate pack comprises a cap positioned on at least a portion of the first end fluid opening(s) or at least a portion of the second end fluid opening(s), or both, and a width of the permeate passage opening of the permeate sheet can be less than, or equal to, a width of the permeate passage opening of each of the filter sheets in the permeate pack. The permeate pack may optionally comprise a first permeate screen spacer positioned between the first filter sheet and the metal matrix permeate sheet or a second permeate screen spacer positioned between the second filter sheet and the metal matrix permeate sheet, or both. The permeate sheet can comprise, consist of, or consist essentially of material selected from the group consisting of natural or synthetic polymers (e.g., polypropylene, polyethylene, polysulfone, polyethersulfone, polyetherimide, polyimide, polyvinylchloride, polyester, nylon, silicone, urethane, regenerated cellulose, polycarbonate, cellulose acetate, cellulose triacetate, cellulose nitrate, mixed esters of cellulose), silicone, ceramics (e.g., oxides of silicon, zirconium, and/or aluminum), polymeric fluorocarbons (e.g., polytetrafluoroethylene), metals (e.g., stainless steel), compatible alloys, or any combination thereof. The cap(s) are understood to include those described herein in the first aspect. In one embodiment, the permeate sheet comprises, consists of, or consists essentially of stainless steel. In another embodiment, the permeate sheet comprises, consists of, or consists essentially of stainless steel and a width of the permeate passage opening of the permeate sheet can be less than a width of the permeate passage opening of each of the filter sheets in the permeate pack.

The methodology of the present invention permits a target substance to be separated from a liquid source material by the simplest mechanical means. The liquid source material can be a solid-liquid mixture or a liquid-liquid mixture, wherein the liquids can be at least one of aqueous, semi-aqueous, or organic. The target substance can be the permeate, the retentate, or both, including, but not limited to, water, non-biological materials (e.g., gypsum, minerals, metals, nanostructures, precipitates), inorganic materials, petroleum products and by-products, food and beverage products, and biological substances (e.g., cells, proteins, microorganisms, etc.). The target substance can be potable or non-potable.

In the use of cross-flow filtration cassettes, the specificity and speed of a desired separation is effected by a number of factors including, but not limited to, a) fluid distribution in the cross-flow module, b) channel height of the cross-flow module, c) channel length, d) shear rate, e) sheet pore structure, f) sheet structure, g) sheet chemistry, h) trans-membrane pressure, i) osmotic force, j) hydrophobic/hydrophilic differential, k) liquid source material modification, l) temperature, and m) pressure drop, which is a function of applied pressure channel length, velocity and solution viscosity.

Importantly, the cross-flow filtration cassettes can be in series or in parallel with reactor vessels and/or additional cross-flow filtration cassettes, as readily understood by the person skilled in the art. Depending on the arrangement of the apparatus, optimal rates of production and separation of a target product can be accomplished.

A seventh aspect relates to a method of separating one or more target substances from a liquid source material, said method comprising:

flowing the liquid source material into at least one filtration cassette of the fifth aspect, as described herein, so as to recover a permeate fluid for disposal, reuse, further filtration, or as a target product; and recovering a retentate stream for disposal, reuse, further filtration, or as a target product.

In the method of the seventh aspect, optionally the liquid source material is diluted with a diluent in an amount sufficient to reduce the viscosity of the liquid source material if the liquid source material is viscous, to form a continuous stream of diluted source material for introduction to the at least one filtration cassette or filtration module. Further, if needed, a diafiltration medium, e.g., buffer, can be introduced to the liquid source material or diluted source material to assist in the recovery of the target substance in the permeate fluid, as readily understood by the person skilled in the art. Additionally, the temperature of the liquid source material can be raised to a range of about 5° C. to about 130° C. to reduce the viscosity of the liquid source material if the liquid source material is viscous, to form a continuous stream of heated source material for introduction to the at least one filtration cassette or filtration module.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

That which is claimed is:

1. A filtration cassette comprising at least one assembly, wherein the at least one assembly comprises:
a multilaminate array of sheet members of generally rectangular and generally planar shape, each sheet of the array having a first end, a second end longitudinally opposite the first end, and a thickness, wherein the sheet members comprise in sequence in said array, a first retentate sheet, (a permeate pack and a second retentate sheet) n, wherein n=1, 2, 3, 4, 5, 6, 7, 8, 9, 10, or more, wherein the permeate pack comprises a first filter sheet, a permeate sheet, and a second filter sheet, wherein each sheet in each permeate pack has at least one fluid opening at the first end thereof and at least one fluid opening at the second end thereof, wherein corresponding fluid openings at the first end of each sheet in each permeate pack are in register with one another and corresponding fluid openings at the second end of each sheet in each permeate pack are in register with one another, wherein the first and second retentate sheets have at least one channel opening therein, each channel opening extending longitudinally between a first channel entrance positioned proximate to fluid openings at the first end of the permeate pack and a second channel entrance positioned proximate to fluid openings at the second end of the permeate pack in the array, and wherein the at least one channel opening is open through the entire thickness of the first and second retentate sheets to permit a fluid to contact adjacent filter sheets, and wherein the first and second retentate sheets are bonded to adjacent filter sheets about peripheral end and side portions thereof; and
two assembly end plates sandwiching the multilaminate array of sheets, each end plate having a first end and a second end corresponding to that of the multilaminate array of sheets, wherein the two assembly end plates comprise at least one fluid opening at the first end thereof and at least one fluid opening at the second end thereof, wherein fluid openings of the end plates are in register with corresponding fluid openings of the permeate pack,
wherein the at least one assembly further comprises at least one permeate passage opening at longitudinal side margin portions of the sheet members of the assembly,
wherein the permeate sheet comprises a foraminous material, a metal matrix, or other reinforced porous material,
wherein the permeate pack further comprises (a) a first permeate screen spacer positioned between, and in direct contact with, the first filter sheet and the permeate sheet, (b) a second permeate screen spacer positioned between, and in direct contact with, the second filter sheet and the permeate sheet, or (c) both the first permeate screen spacer positioned between, and in direct contact with, the first filter sheet and the permeate sheet and the second permeate screen spacer positioned between, and in direct contact with, the second filter sheet and the permeate sheet, and wherein each permeate screen spacer has a first end and a second end corresponding to that of the multilaminate array of sheets, at least one fluid opening at the first end thereof and at least one fluid opening at the second end thereof, and wherein fluid openings of the permeate screen spacers are in register with corresponding fluid openings of the permeate pack.

2. The filtration cassette of claim 1, wherein the filtration cassette is mounted between two holder plates, wherein one holder plate comprises a port for the introduction of fluid to the filtration cassette and the other holder plate comprises a port for the withdrawal of permeate and a port for the withdrawal of retentate from the filtration cassette.

3. The filtration cassette of claim 1, wherein a temperature of a fluid introduced to the filtration cassette is in a range from about 1° C. to about 130° C.

4. The filtration cassette of claim 1, wherein the permeate sheet comprises at least one material selected from the group consisting of woven polymeric mesh, fluorocarbon polymers, ceramics, nonwoven materials, reinforced polymer composites, reinforced porous material, and metal.

5. The filtration cassette of claim 1, wherein the permeate sheet comprises stainless steel.

6. The filtration cassette of claim 1, wherein the filtration cassette is suitable for sonication.

7. The filtration cassette of claim 1, wherein the permeate sheet comprises a metal matrix or other reinforced porous material of requisite thickness, wherein a width of the permeate passage opening of the permeate sheet is less than a width of the permeate passage opening of each of the filter sheets and retentate sheets in the multilaminate array of sheets.

8. The filtration cassette of claim 1, wherein the filtration cassette further comprises a cap positioned on at least a portion of at least one fluid opening of the permeate pack, wherein the cap is positioned proximate to channel entrances of the first and second retentate sheets, and wherein the cap has a general U-shape and transverses the permeate pack through the fluid opening and at least partially overlaps a first side of the first filter sheet and at least partially overlaps a second side of the second filter sheet, with the permeate sheet positioned therebetween.

9. The filtration cassette of claim 8, wherein the cap comprises metals, ceramics, polymeric materials, or combinations thereof.

10. The filtration cassette of claim 9, wherein the cap comprises at least one feature to ensure a more substantial bond with the first filter sheet and the second filter sheet.

11. The filtration cassette of claim 9, wherein the at least one feature: (a) includes a clip, a dimple, a hook and/or texturing; and/or (b) open ends of the cap can extend through an opening in the permeate pack and are bonded, welded or sealed to each other to form an integral seal.

12. The filtration cassette of claim 8, wherein the filtration cassette is designed for parallel flow of fluid within the filtration cassette and the cap is positioned on fluid openings at the first end of the permeate pack or on both fluid openings at the first end and fluid openings at the second end of the permeate pack.

13. The filtration cassette of claim 8, wherein the filtration cassette is designed for series flow of fluid within the filtration cassette and the cap is positioned on some fluid openings at the first end of the permeate pack, or on some fluid openings at the second end of the permeate pack, or both.

14. The filtration cassette of claim 1, wherein the first and/or second permeate screen spacers comprise material having a consistent pattern.

15. The filtration cassette of claim 1, wherein the first and/or second permeate screen spacers comprise natural polymers, synthetic polymers, silicone, ceramics, metals, polymeric fluorocarbons, compatible alloys, or any combination thereof.

16. The filtration cassette of claim 1, wherein the permeate sheet comprises stainless steel and wherein the filtration cassette further comprises a cap positioned on at least a portion of at least one fluid opening of the permeate pack, wherein the cap is positioned proximate to channel entrances of the first and second retentate sheets, and wherein the cap has a general U-shape and transverses the permeate pack through the fluid opening and at least partially overlaps a first side of the first filter sheet and at least partially overlaps a second side of the second filter sheet, with the permeate sheet positioned therebetween.

17. A method of separating a target substance from a liquid source material, said method comprising:

flowing the liquid source material into at least one filtration cassette of claim 1 so as to recover a permeate fluid for disposal, reuse, further filtration, or as a target product; and recovering a retentate stream for disposal, reuse, further filtration, or as a target product.

18. A method of separating a target substance from a liquid source material, said method comprising:

flowing the liquid source material into at least one filtration cassette of claim 16 so as to recover a permeate fluid for disposal, reuse, further filtration, or as a target product; and recovering a retentate stream for disposal, reuse, further filtration, or as a target product.

19. The method of claim 17, wherein a temperature of the liquid source material is in a range from about 1° C. to about 130° C.

20. The method of claim 18, wherein the method further comprises the application of an acoustic field or wave to generate ultrasound waves and to enhance the separation of the target substance from the liquid source material.

* * * * *